US012784600B2

(12) United States Patent
Vinod et al.

(10) Patent No.: US 12,784,600 B2
(45) Date of Patent: Nov. 3, 2026

(54) SYSTEM AND METHOD FOR AIRCRAFT APPROACH MANAGEMENT

(71) Applicant: Mitsubishi Electric Research Laboratories, Inc., Cambridge, MA (US)

(72) Inventors: Abraham Puthuvana Vinod, Cambridge, MA (US); Sachiyo Yamazaki, Cambridge, MA (US); Ankush Chakrabarty, Bedford, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 20 days.

(21) Appl. No.: 18/956,813

(22) Filed: Nov. 22, 2024

(65) Prior Publication Data

US 2026/0011252 A1 Jan. 8, 2026

Related U.S. Application Data

(60) Provisional application No. 63/668,646, filed on Jul. 8, 2024, provisional application No. 63/668,041, filed on Jul. 5, 2024.

(51) Int. Cl.
*G08G 5/22* (2025.01)
*B64D 45/00* (2006.01)
*G08G 5/26* (2025.01)

(52) U.S. Cl.
CPC ............... *G08G 5/22* (2025.01); *B64D 45/00* (2013.01); *G08G 5/26* (2025.01)

(58) Field of Classification Search
CPC .. G08G 5/22; G08G 5/26; G08G 5/54; G08G 5/56; G08G 5/723; G08G 5/21; B64D 45/00
See application file for complete search history.

(56) References Cited

U.S. PATENT DOCUMENTS 10,497,269 B2 * 12/2019 Donovan ................ G08G 5/51
2013/0184978 A1 * 7/2013 Subbu ...................... G08G 5/56 701/120

(Continued)

OTHER PUBLICATIONS

Dynamic Robust Sequencing and Scheduling Under Uncertainty for the Point Merge System in Terminal Airspace (Year: 2017).*

(Continued)

*Primary Examiner* — Adam R Mott
*Assistant Examiner* — Sagar Kc
(74) *Attorney, Agent, or Firm* — Gene Vinokur

(57) ABSTRACT

The present disclosure provides a system and a method for controlling an aircraft within a terminal maneuvering area (TMA) of an airport in the presence of multiple other aircraft. The method includes solving an optimal control problem subject to constraints maintaining a pre-determined separation of the aircraft from the other aircraft in the TMA to determine a state trajectory of the aircraft indexed on a predetermined sequence of TMA stages of the aircraft approaching a merging point in the TMA. The state trajectory of the aircraft is a sequence of states having a one-to-one correspondence with the sequence of TMA stages. The state of the aircraft includes a time state variable indicative of a time remaining for reaching the merging point. The aircraft is then controlled on the basis of an optimal state trajectory that is determined using the state trajectory.

20 Claims, 18 Drawing Sheets

(56) References Cited

U.S. PATENT DOCUMENTS

| | | | | |
|---|---|---|---|---|
| 2019/0005828 | A1* | 1/2019 | Costas | G08G 5/723 |
| 2022/0297821 | A1* | 9/2022 | Tsurumi | H04W 4/38 |
| 2023/0169876 | A1* | 6/2023 | Narasimhulu | G08G 5/53<br>701/120 |
| 2025/0130764 | A1* | 4/2025 | Lim | G08G 5/55 |

OTHER PUBLICATIONS

Optimal Scheduling Algorithm in Point Merge System Including Holding Pattern Based on MILP (Year: 2017).*

* cited by examiner

304

| | |
|---|---|
| $m = 0$ | Start-to-hold 111 |
| $m = 1$ | Hold 112 |
| $m = 2$ | Hold-to-PMS 113 |
| $m = 3$ | PMS 114 |
| $m = 4$ | PMS-to-goal 115 |
| $m = 5$ | Goal 116 |

FIG. 3B

SYSTEM AND METHOD FOR AIRCRAFT APPROACH MANAGEMENT

TECHNICAL FIELD

The present disclosure relates generally to motion planning of aircraft, and more particularly to a system and a method for planning motion of one or more aircraft during an approach phase.

BACKGROUND

With growing levels of air traffic and limited availability of space around existing airports, air traffic management has become important. Currently, most of the air traffic management is done manually by air traffic controllers, which is prone to error due to high workload and fatigue related issues with the air traffic controllers. Such errors are costly, as these could lead to errors in decision-making regarding aircraft approach management and may result in accidents and fatalities.

Some methods for air traffic management involve control procedures that include solving control problems that are based on mixed-integer programming and dynamic programming. These methods are generally based on limited data sets and do not provide real-time guarantees that are required for effective air traffic management. Therefore, these methods are not practical for busy airports. Also, some dynamic programming-based methods have been used for determining landing sequences for aircraft and do not offer a wholistic and optimal solution for different aspects of air traffic control, which may involve many metrics and constraints. Other methods provide heuristic solutions for aircraft control using a limited set of maneuvers only or focus mainly on the problem of user-interface design for the air traffic control tower.

Therefore, there exists a requirement for effective air traffic control methods and systems addressing air traffic control problems.

SUMMARY

It is an object of some embodiments to provide systems, methods, and controllers for enabling effective air traffic control near airports, by providing solutions for aircraft approach management that can accommodate a broader class of the maneuvers.

Some embodiments disclose systems, methods, and controllers that can explicitly design safe trajectories for aircraft instead of abstracting the problem away to a "decision support tool" and enforce maneuver preferences that are environment friendly as well as improve the passenger comfort.

Some embodiments provide autonomous solutions for safe air traffic management that help reduce the workload on air traffic controllers and improve the operating efficiency of the airports. The solutions disclosed herein are also acceptable for pilots and controllers, and compliant with current air traffic control procedures to ensure the possibility of rapid deployment.

Some embodiments are based on the principles of dynamic programming and reachability analysis to perform air traffic management near airports. The systems, methods, and controllers disclosed in various embodiments optimize various performance metrics under constraints from dynamics, actuation limitations, and safety requirements.

It is an object of some embodiments to provide systems and methods for autonomously designing safe aircraft trajectories during an approach phase of an aircraft. The approach phase starts with the aircraft entering a terminal maneuvering area (TMA) and ends when the aircraft reaches a merge point near an airport. The TMA is a designated control area around the airport where there is a high volume of air traffic. At the merge point, the aircraft initiates a landing pattern, and the aircraft is handed-off to the tower control. Once the aircraft enters a landing traffic pattern, all motion parameters until landing are fixed.

It is an object of some embodiments to provide methods, controllers and systems for aircraft trajectory generation in the TMA. To that end, some embodiments use dynamic programming and reachability analysis to perform air traffic management near airports that optimizes various performance metrics under constraints from dynamics, actuation limitations, and safety requirements.

It is an object of some embodiments to disclose a system and a method for aircraft approach management near airports. It is an object of some embodiments to provide such a system and a method that enables a control system suitable for scheduling and/or controlling multiple aircraft for landing at an airport when they are in the vicinity of the aircraft terminal maneuvering area. The control system prescribes safe trajectories for aircraft approach under constraints arising from dynamics, actuation limitations, and safety requirements while optimizing various performance metrics including minimizing the deviation from the desired landing time, minimizing communication between air traffic control and pilots, and maximizing satisfaction of maneuver preferences.

Some embodiments are based on the recognition that such scheduling can be solved as a mixed-integer control (MIC) problem. However, solving MIC problems in real-time for multiple aircraft subject to various safety constraints and regulations can be computationally prohibitive.

Some embodiments are based on the realization that the complexity of the problem of scheduling multiple aircraft can be reduced using the first come first served (FCFS) model allowing one to focus on scheduling a single aircraft subject to constraints defined by landing trajectories of previously scheduled aircraft. Indeed, at least in theory, the FCFS framework may provide a method for controlling an aircraft within the TMA of an airport in the presence of multiple other aircraft by solving an optimal control problem subject to constraints maintaining a pre-determined separation of the aircraft from the other aircraft in the TMA. However, even such a constraint optimization problem can be computationally too expensive to be practical for different landing terminal configurations in different airports.

To that end, it is an object of some embodiments to provide a method for solving constrained optimization problems in real-time to determine the state trajectory of an aircraft suitable for controlling an aircraft within a terminal maneuvering area (TMA) of an airport in the presence of multiple other aircraft.

Some embodiments are based on a realization that current landing procedures are performed in a semi-manual mode which is prone to errors and mistakes.

Some embodiments are based on the understanding that, usually, a trajectory of an aircraft is parameterized or indexed on time. In other words, a trajectory x(t) is a function of time, and a trajectory defines a sequence of states as $x_{t1}, x_{t2}, \ldots x_{tn}$. The states are indexed or ordered by time to show the evolution of the dynamics over time, but the state variables do not include time. Such state trajectories can represent any motion of the aircraft in a spatial-temporal domain, but that flexibility does not consider the specifics of the landing procedures and causes the complexity of possible optimization solvers.

However, some embodiments are based on the realization that during the landing there are a specific number of actions the aircraft is allowed to take. These actions have a structure that can be parameterized on a sequence of stages that an aircraft should follow. At each stage, the aircraft can take different types of actions with quantized values. For example, in some embodiments, the possible types of actions, also referred to as maneuvers, include HOLD, point-merge-system (PMS), and velocity decrements (DEC) maneuvers, which can be used to define different stages in aircraft control, the stages including START; START-TO HOLD, HOLD, HOLD-TO-PMS, PMS, PMS-TO-GOAL, AND GOAL stages. Because these states form an ordered sequence, the order of states for each of the stages is given by default and can be used to impose structure on the states of the aircraft allowing to reduce the dimensionality and/or impose sparsity on the state.

To do so, the evolution of the states of the aircraft is parameterized or indexed on the stages by replacing a time index of the state with the index of the stage. So, embodiments instead of determining x(t) trajectory, determine x(m) trajectory $x_{m1}$, $x_{m1}$, . . . , $x_{mn}$, wherein m is an index of a stage. To achieve that, some embodiments disclose making time as a part of the state, which is not the case for x(t) trajectories. On one hand, such a preplacement is counter-intuitive because it increases the dimensionality of the problem. On the other hand, due to a limited number of stages, the state space becomes quantized and sparse. Doing this in such a manner allows formulation of a state trajectory of an aircraft as a sequence of partial states of the aircraft corresponding to a predetermined sequence of landing stages, which simplifies the computation.

Some embodiments are based on a recognition that, at least in theory, the constraint optimization problem can be simplified if partitioned into two parts. In the first part, various techniques, such as a reachability analysis, can be used to select feasible (but not necessarily optimal) trajectories satisfying the constraints. Next, during the second part, the optimization is performed unconstrained but on the feasible trajectories to select the optimal trajectory among the feasible ones. However, in practice, the reachability analysis of state space needed for controlling an aircraft is still computationally challenging. Indeed, the full state of the aircraft for landing purposes includes at least four variables, two variables (e.g., x and y) defining the position, time till assigned landing, and velocity of the aircraft. Some embodiments are based on a recognition that the complexity of reachability analysis depends on the dimensions and quantization of the state.

Some embodiments disclose that state variables of a partial state of the aircraft are selected such that full states of the aircraft are defined by values of the partial states, order of the values of the partial states in the sequence, and action space predetermined for each of the landing stages. For example, some embodiments define a three-dimensional space of a partial state having time till the scheduled landing dimension, velocity dimension, and dimension for orientation of the aircraft with respect to the merge point. Each of the state variables is defined at the beginning of the trajectory segment corresponding to a stage.

Moreover, some embodiments are based on the realization that the feasible trajectories can be determined using a discrete-time Markov Decision Process (MDP) with discrete action space with stages used to represent and/or quantized time. Such a discrete-stage MDP can be used to find feasible state trajectories using, e.g., dynamic programming. During the second part of the optimization, various preferences and optimality conditions can be formulated as cost functions and/or as reward functions allowing the use of dynamic programming for the second part of the optimization as well.

Accordingly, one embodiment discloses a method for controlling an aircraft within a terminal maneuvering area (TMA) of an airport in the presence of multiple other aircraft. The method comprises solving an optimal control problem subject to constraints maintaining a pre-determined separation of the aircraft from the other aircraft in the TMA to determine a state trajectory of an aircraft indexed on a predetermined sequence of TMA stages of the aircraft approaching a merging point in the TMA, such that the optimal state trajectory of the aircraft is a sequence of states having a one-to-one correspondence with the sequence of TMA stages. To that end, a state of the aircraft includes a time state variable indicative of a time remaining for the reaching the merging point, wherein different TMA stages are associated with different action space permitted for a specific TMA stage. The method further comprises causing controlling of the aircraft for different TMA stages according to the state trajectory.

Accordingly, yet another embodiment discloses a controller for controlling an aircraft within a terminal maneuvering area (TMA) of an airport in the presence of multiple other aircraft, the controller comprising a processor; and a memory having instructions stored thereon that, when executed by the processor, cause the controller to solve an optimal control problem subject to constraints maintaining a pre-determined separation of the aircraft from the multiple other aircraft in the TMA to determine a state trajectory of an aircraft indexed on a predetermined sequence of TMA stages of the aircraft approaching a merging point in the TMA, such that the state trajectory of the aircraft is a sequence of states having a one-to-one correspondence with the sequence of TMA stages, wherein a state of the aircraft includes a time state variable indicative of a time remaining for the reaching the merging point, wherein different TMA stages are associated with different action space permitted for a specific TMA stage. The controller is further caused to control the aircraft for different TMA stages according to the state trajectory.

The presently disclosed embodiments will be further explained with reference to the attached drawings. The drawings shown are not necessarily to scale, with emphasis instead generally being placed upon illustrating the principles of the presently disclosed embodiments.

BRIEF DESCRIPTION OF THE DRAWINGS

FIG. 3B illustrates a table showing value of the variable m corresponding to the sequence of TMA stages, according to an embodiment of the present disclosure.

DETAILED DESCRIPTION

Figure 1A:
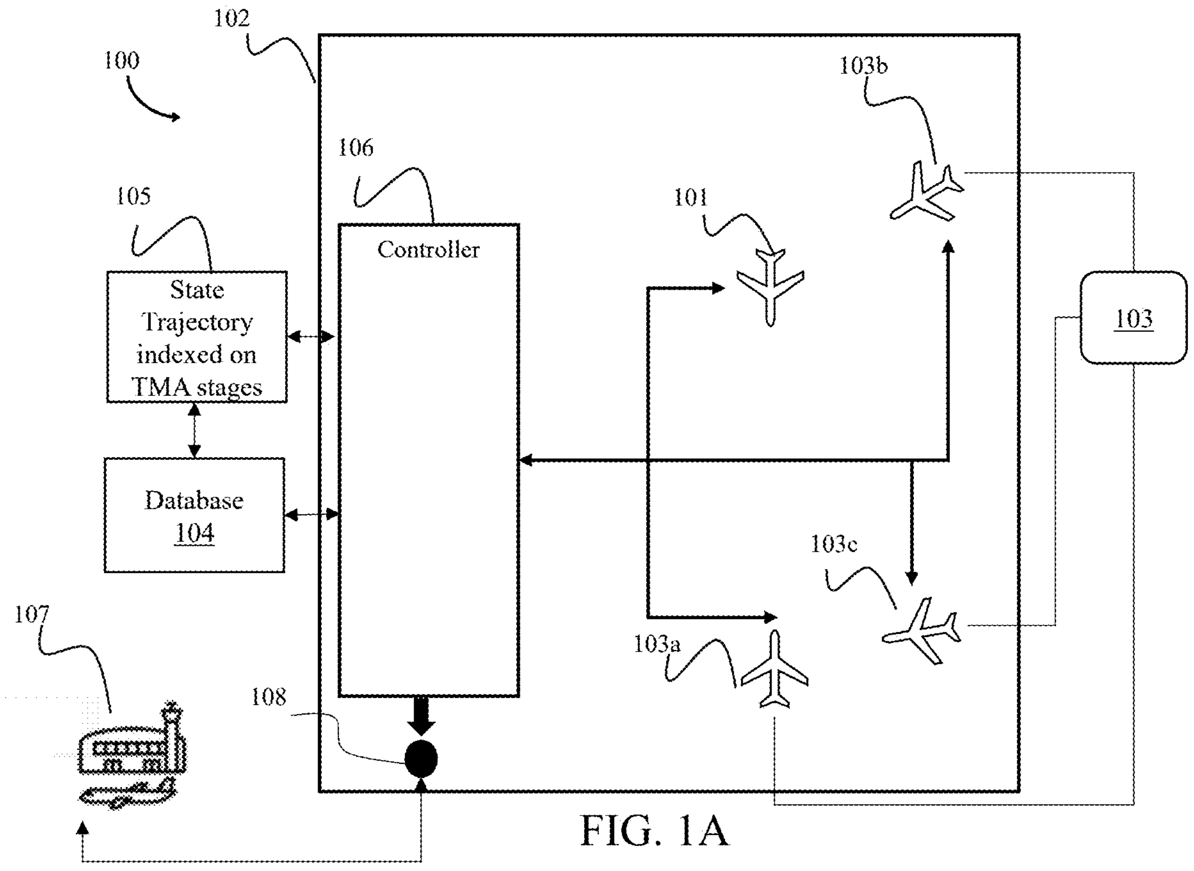
FIG. 1A illustrates a block diagram of an environment using a controller for causing controlling of an aircraft, according to an embodiment of the present disclosure.

In the following description, for purposes of explanation, numerous specific details are set forth to provide a thorough understanding of the present disclosure. It will be apparent, however, to one skilled in the art that the present disclosure may be practiced without these specific details. In other instances, apparatuses and methods are shown in block diagram form only to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Some embodiments of the present disclosure provide methods and systems for designing aircraft approach trajectories and scheduling airport arrival times for aircraft when they are in the vicinity of aircraft terminal manoeuvring area (TMA). To that end, some embodiments consider the dynamics of the aircraft, limited available manoeuvres an aircraft can execute including HOLD, point-merge-system, and velocity decrements, and safety constraints arising from separation requirements.

Some embodiments of the present disclosure provide methods and systems for controlling an aircraft in vicinity of the TMA while keeping in consideration several performance metrics such as minimizing a deviation of the realized landing time of the aircraft from the scheduled landing time and adherence to manoeuvre preferences where velocity decrements are preferred over point-merge-system over HOLD.

Some embodiments are based on the realization that constraints associated with control of the aircraft may be translated as restrictions on the actions available to each subsequent aircraft. These restrictions may be formally identified using reachability and dynamic programming. Specifically, given a set of scheduled aircraft, the separation requirements on a new aircraft entering the TMA may be encoded as a collection of safe sets that the new aircraft must stay within. Additionally, the manoeuvres and the dynamics constraints on the new aircraft may be modelled as a Markov decision process.

Some embodiments are based on the usage of dynamic programming techniques, for identifying the set of actions the new aircraft must take so that it remains within the safe sets.

Some embodiments of the present disclosure provide for sequentially scheduling aircraft to optimize their performance metrics upon restricting their available actions to safe actions based on previously scheduled aircraft. Such an approach has several advantages including obtaining an interpretable scheduling for the aircraft and reducing the workload on the air traffic controllers. Interpretable scheduling is crucial when such an air traffic management system must be used in conjunction with human air traffic controllers. Additionally, by sequentially optimizing the aircraft, the burden of communication required between aircraft pilot and the air traffic controller can be reduced substantially. Additionally, by automating the scheduling and control of the aircraft while in vicinity of the TMA, accidents, and fatalities due to human errors can be minimized.

FIG. 1A illustrates a block diagram of an environment 100 using a controller 106 for controlling an aircraft 101, according to an embodiment of the present disclosure. The controller 106 is configured to execute a method for controlling the aircraft 101 within a terminal maneuvering area (TMA) 102 of an airport 107 in the presence of multiple other aircraft-such as an aircraft 103*a*, an aircraft 103*b*, and an aircraft 103*c* (hereinafter collectively referred to as multiple other aircraft 103). It may be understood that only three aircraft are shown as other aircraft in FIG. 1 for the sake of an example, however any number of aircraft may equivalently present as multiple other aircraft, without deviating from the scope of the present disclosure. The TMA 102 is a designated airspace around a busy airport where arriving and departing aircraft are closely managed and sequenced by air traffic control (ATC). This airspace is structured to ensure safe and efficient aircraft handling as flights transition between en-route airspace and the airport's final approach or departure paths. Aircraft entering the TMA 102 may be sequenced into holding patterns, Point Merge Systems (PMS), or other structures, depending on traffic density and sequencing needs.

The airport 107 may have limited space and encounter congestion issues due to the presence of the aircraft 101 and the multiple other aircraft 103. To overcome these issues, the controller 106 provides autonomous solutions for safe air traffic management, and helps reduce the workload on air traffic controllers, and improve the operating efficiency of the airport 107. The controller 106 also provides these solutions in view of preferences of pilots and air traffic controllers, and compliant with current air traffic control procedures to ensure the possibility of rapid deployment.

In an embodiment, the controller 106 enables autonomous design of safe aircraft trajectories during an approach phase of the aircraft 101. The approach phase for any aircraft starts with the aircraft entering the TMA 102 and ends when the aircraft reaching a merge point 108 near the airport 107. The merge point 108 is a designated navigational waypoint within the TMA 102 where incoming aircraft routes converge. The merge point 108 serves as a central reference location for facilitating the sequential alignment of arriving flights. Aircraft are directed to the merge point 108 point from predefined paths or arcs positioned around it, allowing for controlled spacing and sequencing before they proceed toward the final approach path. The merge point 108 enables efficient traffic management by minimizing the need for holding patterns and optimizing descent profiles, thereby reducing fuel consumption and emissions. At the merge point 108, the aircraft 101 initiates a landing pattern, and is handed off to a tower control of the airport 107. Once the aircraft 101 enters the landing traffic pattern, all motion parameters until landing are fixed.

The controller 106 enables determination of this landing pattern by determining a state trajectory 105 of the aircraft 101. In an embodiment, the state trajectory 105 of the aircraft 101 is indexed on a predetermined sequence of TMA stages of the aircraft 101 approaching the merging point 108 in the TMA 102. The determination of the state trajectory 105 is based on solving an optimal control problem subject to constraints maintaining a pre-determined separation of the aircraft 101 from another aircraft, such as the aircraft **103*a*, of the multiple other aircraft 103 in the TMA 102, such that the state trajectory 105 of the aircraft 101 is a sequence of states of the aircraft 101, the sequence of states having a one-to-one correspondence with the sequence of TMA stages. Further, a state of the aircraft 101 includes a time state variable indicative of a time remaining for reaching the merging point 108. To that end each of the predetermined sequence of TMA stages are associated with an action space permitted for the corresponding TMA stage. The controller 106 causes controlling of the aircraft 101 for each of the predetermined sequence of TMA stages based on the determined state trajectory 105**.

In some embodiments, the state trajectory 105 of the aircraft 101 is stored in a database 104. The database 104 may store the state trajectories of all the aircraft entering or leaving the airport 107. In an embodiment, the controller 106 retrieves a previously stored state trajectory for an aircraft, when that aircraft enters the TMA 102, and updates the stored state trajectory based on real-time parameters such as other aircraft present within the TMA 102, fuel status of the aircraft, weather conditions, and the like.

To that end, the controller 106 enables real-time generation of the state trajectory 105 of the aircraft 101 within constraints that guarantee safety and optimal operational time, but indexing the state trajectory 105 on TMA stages, and including a time remaining for reaching the merging point 108 as a state variable for the state trajectory 105.

In some embodiments, the controller 106 may provide physical control actions for the aircraft 101 to execute. Alternatively, the controller 106 may consist of instructions relayed to the pilot of the aircraft 101 that is then executed. Alternatively, the controller 106 may provide an exemplar trajectory for the air traffic controller who then uses it to decide the instructions to be relayed to the pilot.

Figure 1B:
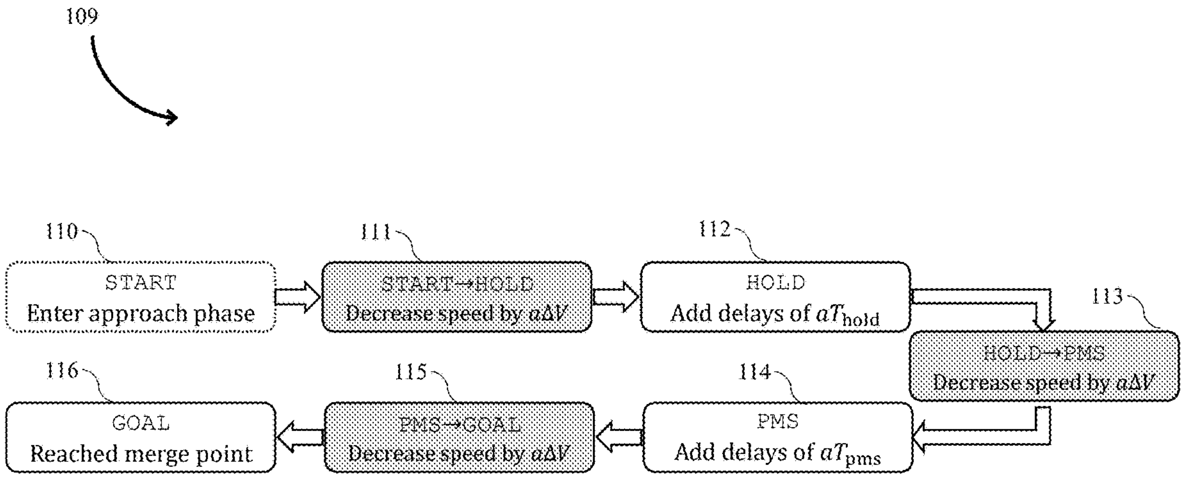
FIG. 1B illustrates a block diagram of a sequence of TMA stages, according to an embodiment of the present disclosure.

FIG. 1B illustrates a block diagram showing a sequence of TMA stages 109, according to an embodiment of the present disclosure. FIG. 1B is explained in conjunction with elements from FIG. 1A. The sequence of TMA stages 109 include a start 110 stage, a start-to-hold 111 stage, a hold 112 stage, a hold-to-PMS 113 stage, a PMS 114 stage, a PMS-to-goal 115 stage and a goal 116 stage. The sequence of TMA stages 109 start when the aircraft 101 is in the approach phase. The approach phase starts with the aircraft 101 entering the TMA 102 and ends when the aircraft 101 reaches the merge point 108 near the airport 107. At the merge point 108, the aircraft 101 initiates a landing pattern, and the aircraft 101 is handed-off to the tower control of the airport 107. When the aircraft 101 is in one of the sequence of TMA stages 109, three different maneuvers are employed for air traffic management near airports-holding pattern (HOLD), point merge system (PMS), and speed decrement (DEC). Each of these maneuvers introduces an additional delay in the aircraft's arrival at the merge point 108. In a HOLD maneuver, the aircraft 101 travels in a pre-determined holding pattern. In a DEC maneuver, the aircraft 101 reduces its speed while traveling along a straight path. In a PMS maneuver, the aircraft 101 flies along a sequencing leg (an arc around the merge point) for a pre-specified duration, after which it heads towards the merge point. Each of these sequence of TMA stages 109 is explained in conjunction with FIG. 1C and FIG. 1D as follows.

Figure 1C:
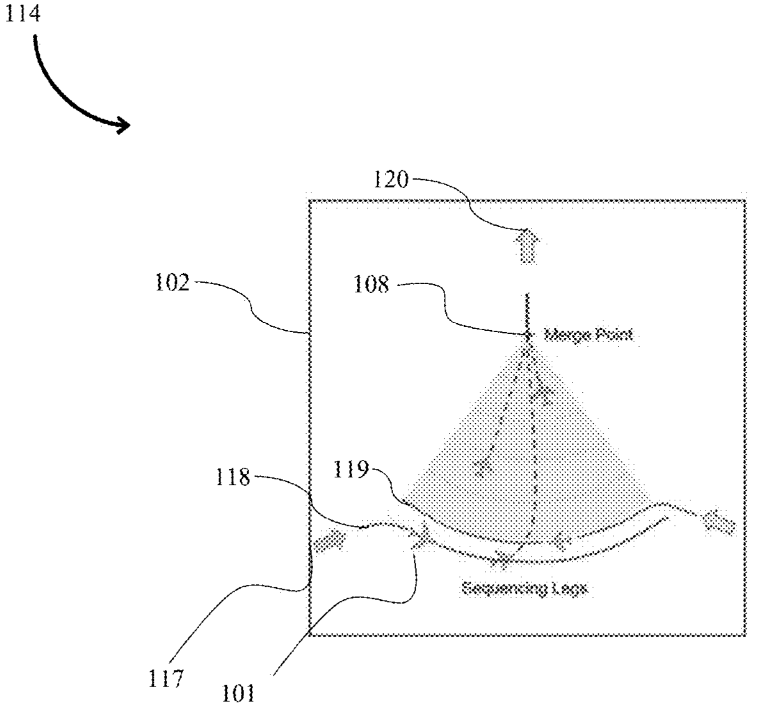
FIG. 1C illustrates a schematic diagram of the PMS stage, according to an embodiment of the present disclosure.

FIG. 1C illustrates a schematic diagram of the PMS 114 stage according to an embodiment of the present disclosure. The PMS 114 stage is used for sequencing aircraft arrivals. The aircraft 101 enters 117 the TMA 102 on "sequencing legs," represented by a first curved path 117 and a second curved path 118, on either side of the merge point 108, as an example. These sequencing legs allow for gradual adjustment of position of the aircraft 101 to ensure proper spacing when multiple other aircraft 103 are present in the TMA 102. As each aircraft reaches the appropriate point along the sequencing leg, it is directed to turn toward the merge point 108 in the center, following a direct path toward the runway approach. This structure ensures orderly and efficient sequencing, allowing the aircraft 101 to merge smoothly with minimal intervention of the tower controller and reduced need for holding patterns.

Figure 1D:
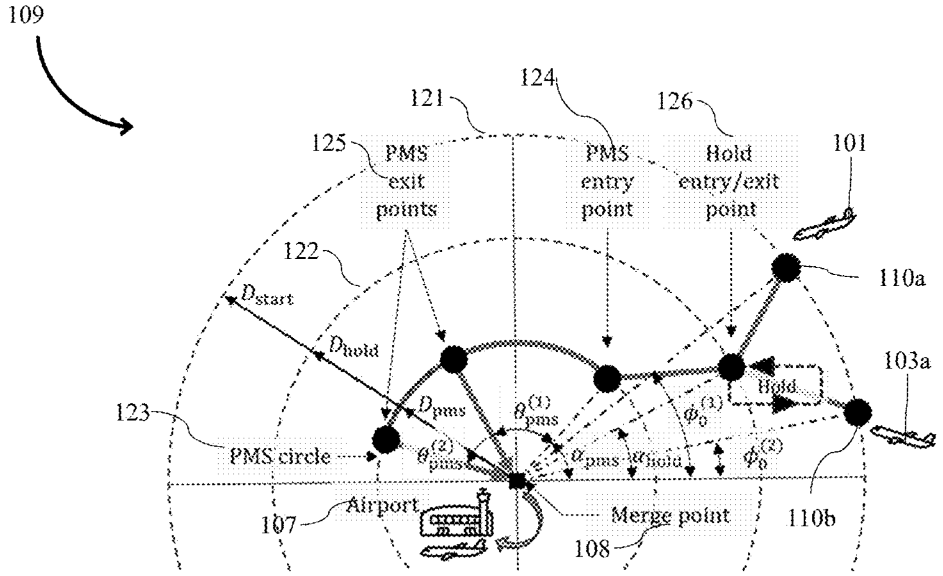
FIG. 1D illustrates the sequence of TMA stages according to the PMS structure, according to an embodiment of the present disclosure.

FIG. 1D illustrates the sequence of TMA stages 109 that incorporate HOLD and PMS maneuvers, according to an embodiment of the present disclosure. There are shown as an example three circles, each denoting the distances at which the TMA starts 121, the hold entry point is located 122, and finally the PMS circle 123. The PMS circle represents the PMS sequencing areas where arriving aircraft follow a predetermined path. These circles help to organize aircraft and manage spacing as they approach the airport 107. Further, there are illustrated different waypoints on the different PMS circles. For example, a waypoint 124 is a PMS entry point and waypoints 125 represent potential PMS exit points. In an example, the aircraft 101 enters the PMS circle 123 at the waypoint 124 and can exit the PMS circle 123 at any of the waypoints 125, based on spacing requirements and air traffic controller instructions. A waypoint 126 represents a hold entry/exit point which represents the entry and exit to a holding pattern, where the aircraft 101 can perform circular "hold" loops if spacing adjustments are needed. In an embodiment, the aircraft 101 circles at the waypoint 126 to delay their arrival at the merge point 108 if another aircraft 103*a* needs priority or to maintain safe separation. Further, various angles such as $\theta_{pms}$, $\alpha_{pms}$ and $\alpha_{hold}$ represent orientations and positions of any aircraft, such as the aircraft 101 relative to the merge point 108 or the entry points. These angles help to indicate the aircraft's trajectory and orientation at each phase of the approach sequence.

In an embodiment, FIG. 1D illustrates the sequence of TMA stages 109 for a problem of generating safe trajectories for $N \in \mathbb{N}$ aircraft, where each aircraft if $\in \mathbb{N}[1,N]$ can only perform maneuvers illustrated in FIG. 1C or FIG. 1D, which are familiar for pilots, controllers, and air traffic control systems. In the embodiments illustrated herein, only the lateral (latitude and longitude) motion of the aircraft 101 is considered for simplicity, and altitude changes are ignored. Additionally, a polar coordinate system is used to describe the intermediate points of interest, with the merge point 108 as the origin.

Referring back to FIG. 1B, in conjunction with FIG. 1D, the start 110*a* stage is the initial stage of the trajectory for the aircraft 101, where the aircraft 101 enters the TMA 102, defined as a ball of radius $D_{start}>0$ around the merge point 108. At the start 110 stage, the current time $t_0 \geq 0$, the current orientation of the aircraft 101 with respect to the merge point 108 is $\varphi_0 \in [0, 2\pi)$, and the desired arrival time at the merge point 108 is $t_{arrival}>t_0$. The initial information associated with aircraft $i \in \mathbb{N}_{[1,\,N]}$ is represented by a tuple $$\mathcal{J}_i = \left(t_0^{(i)}, \varphi_0^{(i)}, t_{arrival}^{i}\right).$$

By design, the position of the aircraft i at the start 110 stage is $$\left\langle D_{start}, \varphi_0^{(i)} \right\rangle.$$

In an example, all aircraft enter the TMA 102 at an identical initial speed $V_0$, which is reasonable based on standard flight plans and controlled airspace rules.

Next, the aircraft 101 proceeds to the start-to-hold 111 stage during which the speed of the aircraft 101 may be decreased in steps of a pre-specified amount, denoted as $\alpha\Delta V$, where $\alpha$ is a trajectory design variable for the stage 111. Further, the aircraft 101 proceeds to the hold 112 stage where additional delays of the order of $\alpha_{hold}T_{hold}$ are added to the aircraft 101 trajectory, where $\alpha_{hold}$ is a trajectory design variable for the stage 112. The aircraft 101 enters the hold 112 stage at the waypoint 126 which is the hold entry point, which is located at $\langle D_{hold}, \alpha_{hold} \rangle$ with $D_{hold} \in (0, D_{start})$. Upon reaching the hold entry point at the waypoint 126, the aircraft 101 may be asked to perform $a_{hold} \in \mathbb{N}_{[0,\,N_{hold}]}$ hold maneuvers for some $N_{hold} \in \mathbb{N}$, or continue towards the PMS entry point 124. In a hold maneuver, the aircraft 101 follows a pre-defined loop that originates and terminates at the hold entry point, and each hold maneuver introduces a delay of $T_{hold}>0$ minutes, and therefore a hold maneuvers introduce total delay of $\alpha_{hold}T_{hold}$ minutes.

During the transition of the aircraft from the hold 112 stage to the PMS 114 stage, the aircraft is in the hold-to-PMS 113 stage. In the hold-to-PMS 113 stage, the speed of the aircraft 101 may be further decreased by $\alpha\Delta V$, where $\alpha$ is a trajectory design variable for the stage 113. The process enables flexibility by allowing the aircraft 101 to cycle back to the hold 112 stage for additional spacing adjustments before continuing to the PMS 114 stage.

As the aircraft 101 proceeds to the PMS 114 stage, the aircraft 101 continues towards the waypoint 124 which is the PMS entry point, located at $\langle D_{pms}, \alpha_{pms} \rangle$ with $D_{pms} \in (0, D_{hold})$. The aircraft 101 enters the PMS circle 123 at the waypoint 124. The PMS circle 123 is centered at the merge point 108 and has a radius of $D_{pms}$. Upon reaching the PMS entry point, at the waypoint 124, the aircraft 101 may be controlled to subtend an angle $$\theta_{pms} = a\theta_{pms}^{step}$$

at the merge point 108 by traveling along the PMS circle 123 at a constant angular rate $\omega_{pms}=V_{pms}/D_{pms}$, or continue towards the merge point 108. Here, $V_{pms}$ denotes the speed of the aircraft 101 at the PMS entry point, the waypoint 124, and $\alpha \in \mathbb{N}_{[0,N_{pms}]}$ where $$N_{pms} \triangleq \Theta_{pms}^{max}/\theta_{pms}^{step}$$

for some $$\Theta_{pms}^{max} \in (0, 2\pi) \text{ and } \theta_{pms}^{step} \in \left(0, \Theta_{pms}^{max}\right),$$

and $\alpha$ is a trajectory design variable for the stage 114. A PMS maneuver delays the aircraft by $\alpha T_{pms}$, where $$T_{pms} = \left(D_{pms}\theta_{pms}^{step}\right)/(V_0 - \vartheta_m \Delta V.$$

Upon exiting the PMS circle 123, the aircraft 101 heads towards the merge point 108 via the PMS-to-goal 115 stage with an additional reduction in speed by $\alpha\Delta V$, where $\alpha$ is a trajectory design variable for the stage 115. Finally, the aircraft 101 reaches the goal 116 stage which is the final stage of the aircraft's trajectory, i.e., the aircraft 101 reached the merge point 108.

As discussed above, the aircraft 101 performs speed decrements maneuvers DEC at any or all of the three stages of the trajectory or TMA stages—the start-to-hold 111 stage, the hold-to-PMS 113 stage, and the PMS-to-goal 115 stage. In each of these stages, the aircraft 101 performs an aircraft independent constant deceleration during a DEC maneuver with the deceleration magnitude $B>0$. In an embodiment, the aircraft's speed can be reduced in steps of $\Delta V>0$ by $\alpha\Delta V$ for some $a \in \mathbb{N}_{[0,N_{dec}]}$ for some $N_{dec} \in \mathbb{N}$ and a pre-specified speed decrement $\Delta V>0$.

Some embodiments disclose the use of these three different maneuvers currently employed for air traffic management near airports—holding pattern (HOLD), point merge system (PMS), and speed decrement (DEC). Each of these maneuvers introduces additional delay in the aircraft's arrival at the merge point 108. As already discussed, in a HOLD maneuver, an aircraft travels in a pre-determined holding pattern. In a DEC maneuver, the aircraft reduces its speed while traveling along a straight path. In a PMS maneuver, an aircraft flies along a sequencing leg (an arc around the merge point) for a pre-specified duration, after which it heads towards the merge point 108.

In an embodiment, to increase the passenger comfort and reduce fuel consumption, the maneuvers in the sequence of TMA stages 109 are chosen in a specific order of preference for designing aircraft trajectories. This specific order includes DEC followed by PMS followed by HOLD, which may reduce the changes in the attitude of the aircraft in the TMA.

In some embodiments, the controller 106 is configured to execute a dynamic programming-based algorithm to autonomously identify the sequence of maneuvers the pilots of each aircraft must execute, while respecting the desired order of preference, maintaining desired separation between aircraft for safety, and minimizing the deviation of the aircraft's arrival time at the airport 107 from the desired time of arrival.

To that end, the controller 106 is configured to execute a method to solve an optimal control problem subject to constraints maintaining a pre-determined separation of the aircraft 101 from another aircraft of the multiple other aircraft 103 which enters the TMA 102 at 110*b*, such that the state trajectory 105 of the aircraft is a sequence of states of the aircraft 101. The sequence of states have a one-to-one correspondence with the sequence of TMA stages 109, as will be explained in conjunction with FIG. 2A, FIG. 2B and FIG. 3A.

Figure 2A:
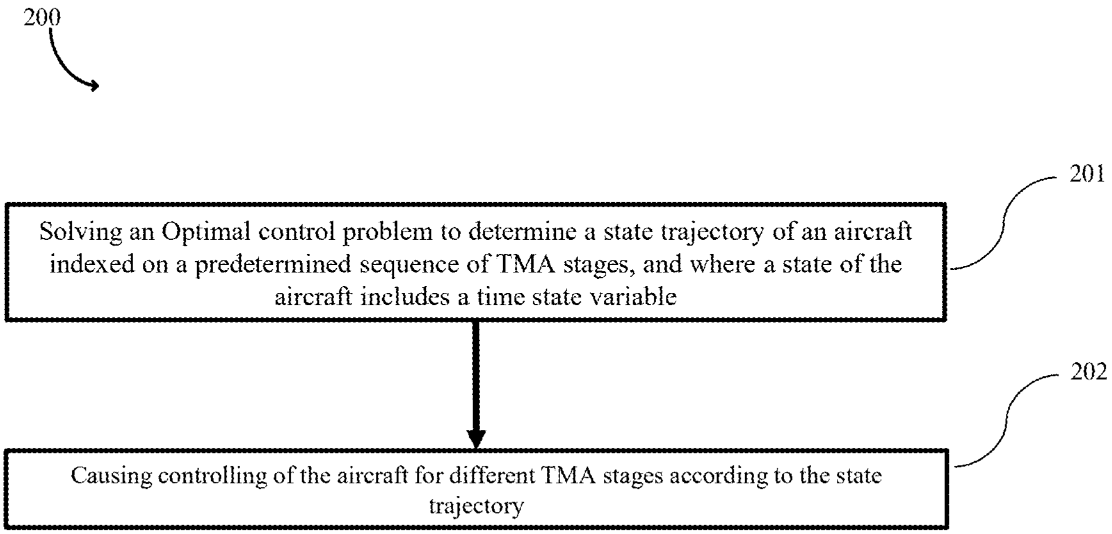
FIG. 2A shows a block diagram of a method executed by the controller for causing controlling the aircraft in vicinity of the TMA, according to an embodiment of the present disclosure.

FIG. 2A shows a block diagram of a method 200 executed by the controller 106 for controlling the aircraft 101 in vicinity of the TMA, according to an embodiment of the present disclosure.

The method 200 includes at 201 executing an operation for solving an optimal control problem to determine the state trajectory 105 of the aircraft 101. The optimal control problem is solved subject to constraints maintaining a pre-determined separation of the aircraft 101 from the other aircraft, such as the aircraft 103 shown in the FIG. 1A, in the TMA 102 to determine the state trajectory 105 of the aircraft 101. In some embodiments, the optimal control problem is solved using a discrete-stage MDP framework having discretization of the sequence of TMA stages 109 replacing discretization of time (in the MDP framework) to find an evolution of the states of the aircraft 101 over the sequence of the TMA stages 109.

The method 200 further includes controlling the aircraft 101 for maneuvering in the different TMA stages 109 based on the determined state trajectory 105. To that end, the controller 106 may generate control commands that are transmitted over a wireless communication medium to the aircraft 101 for maneuvering the aircraft 101 in different TMA stages 109 (it may be understood that the term different TMA stages 109 is used interchangeably with the term sequence of TMA stages 109, without deviating from the scope of the present disclosure).

Figure 2B:
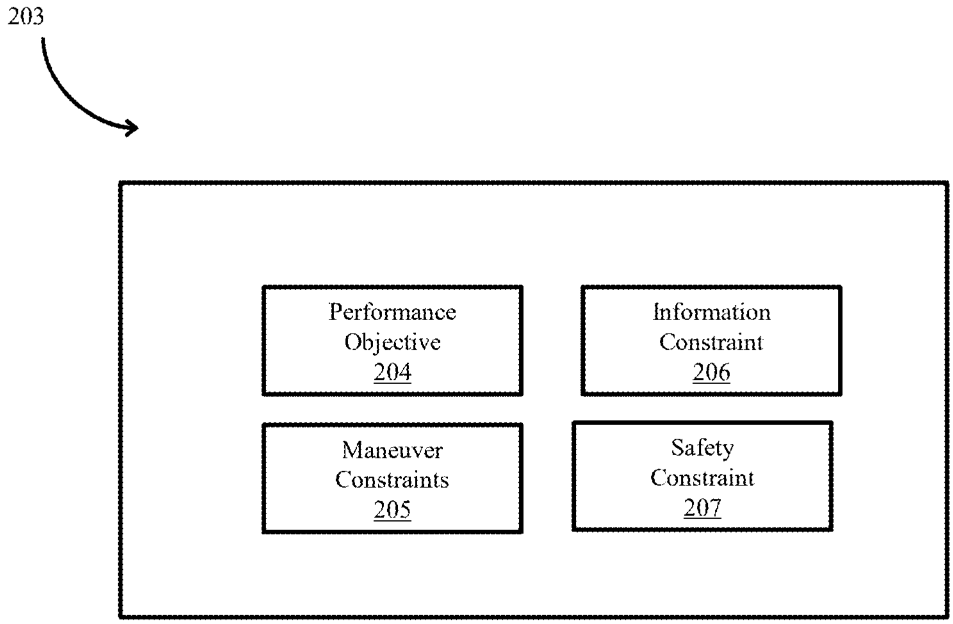
FIG. 2B illustrates a block diagram showing formulation of a trajectory optimization problem, according to an embodiment of the present disclosure.

In some embodiments, the optimal control problem is formulated as a trajectory optimization problem. FIG. 2B illustrates a block diagram showing formulation of a trajectory optimization problem 203 according to an embodiment of the present disclosure. The trajectory optimization problem 203 may be formulated using one or more parameters such as—a performance objective 204, maneuver constraints 205, an information constraint 206, and a safety constraint 207.

The performance objective 204 includes a condition that the aircraft 101 must minimize deviation (if any) from its desired arrival time. The maneuver constraints 205 include conditions on the aircraft motion. The aircraft motion is subject to constraints imposed by the maneuvers. For example, DEC maneuvers are preferred over PMS maneuvers, and PMS maneuvers are preferred over HOLD maneuvers, when possible.

The information constraint 206 sets a limit on the initial information of the aircraft 101 $J_i$ when the aircraft i enters TMA 102. The information constraint 206 also accounts for the limitations of the radars employed by typical airports as well as accommodate any unexpected delays faced by the aircraft 101 during its journey.

The safety constraint 207 includes a condition that for safety, the aircraft 101 must maintain a separation of $D_{sep}>0$ between any other aircraft, when the both aircraft are at least $D_{pms}$—close to the merge point (not farther than $D_{pms}$). For the sake of brevity of disclosure, the safety constraint 207 is applied to aircraft that are within or on the PMS circle 123.

In an embodiment, using optimal control problem is formulated as the trajectory optimization problem 203 with parameters described above. The optimal control problem is referred to as Problem 1 and may be formulated asdesign an algorithm to construct aircraft trajectories comprised only of the admissible maneuvers (DEC, PMS, and HOLD, in their order of preference), such that each aircraft's trajectory minimizes the performance objective 204 while satisfying constraints arising from maneuver 205, information 206, and safety/separation constraints 207.

In an embodiment, an FCFS-based algorithm is used to solve Problem 1. FCFS-based algorithms are popular in air traffic management as they are easy to implement, and they reduce pilot and air traffic controller workloads by not requiring any modifications to the operating instructions once relayed. Along with FCFS-based algorithm, alternative approaches like constrained position switching-based algorithms may be also be used.

In an embodiment, the trajectory optimization problem 203 is formulated as a single aircraft trajectory optimization problem as a low-dimensional Markov Decision Process (MDP). The proposed formulation enforces the maneuver constraints 205 by design, and a reward function is selected motivated by the performance objective 204 as well as the maneuver constraints 205.

Figure 3A:
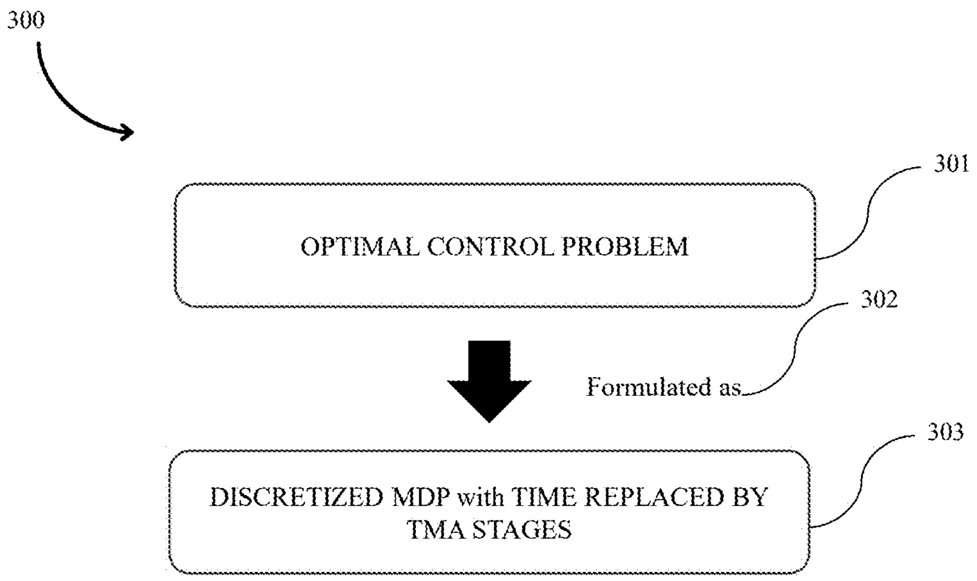
FIG. 3A illustrates a block diagram showing formulating of an optimal control problem as a discrete-time, mixed-state MDP with discrete action space, according to an embodiment of the present disclosure.

FIG. 3A illustrates a block diagram 300 showing formulating 302 of an optimal control problem 301 (equivalent to the trajectory optimization problem 203) as a discrete-time, mixed-state MDP 303 with discrete action space. In the discrete-time, mixed-state MDP 303, time variable is replaced by a variable for the sequence of TMA stages 109. In an embodiment, the discretization of time in discrete-time, mixed-state MDP 303 is replaced with discretization of the sequence of TMA stages 109. Thus, the optimal control problem is solved using a discrete-stage MDP framework having discretization of TMA stages replacing discretization of time to find an evolution of the states of the aircraft 101 over the sequence of the TMA stages 109. Hereinafter the mixed-state MDP 303 is referred to as the MDP 303 denote discretized MDP with time replaced by TMA stages. Here, the mixed-state refers to the observation that MDP 303 that some of the states of the MDP 303 is continuous while others are discrete.

To that end, the six TMA stages after the start 110 stage shown in FIG. 1B are represented using a variable $m \in \mathbb{N}_{[0,5]}$.

FIG. 3B illustrates a table 304 showing value of the variable m corresponding to the sequence of TMA stages 109, according to an embodiment of the present disclosure. As shown in the table 304, m=0 corresponds to the start-to-hold 111 stage, m=1 corresponds to the hold 112 stage, m=2 corresponds to the hold-to-PMS 113 stage, m=3 corresponds to the PMS 114 stage, m=4 corresponds to the PMS-to-goal 115 stage, and m=5 corresponds to the goal 116 stage.

The aircraft trajectory design starts with the aircraft 101 in the start-to-hold 111 stage, where m=0, and terminates at the goal 116 stage with m=5. Therefore, in the MDP 303 framework used by the controller 106 to determine the state trajectory 105 for aircraft, m is used analogously to "time" to define the MDP 303.

The MDP 303 framework is used to cast the problem of trajectory optimization for a single aircraft as a discrete-time, mixed-state MDP with discrete action space.

Figure 3C:
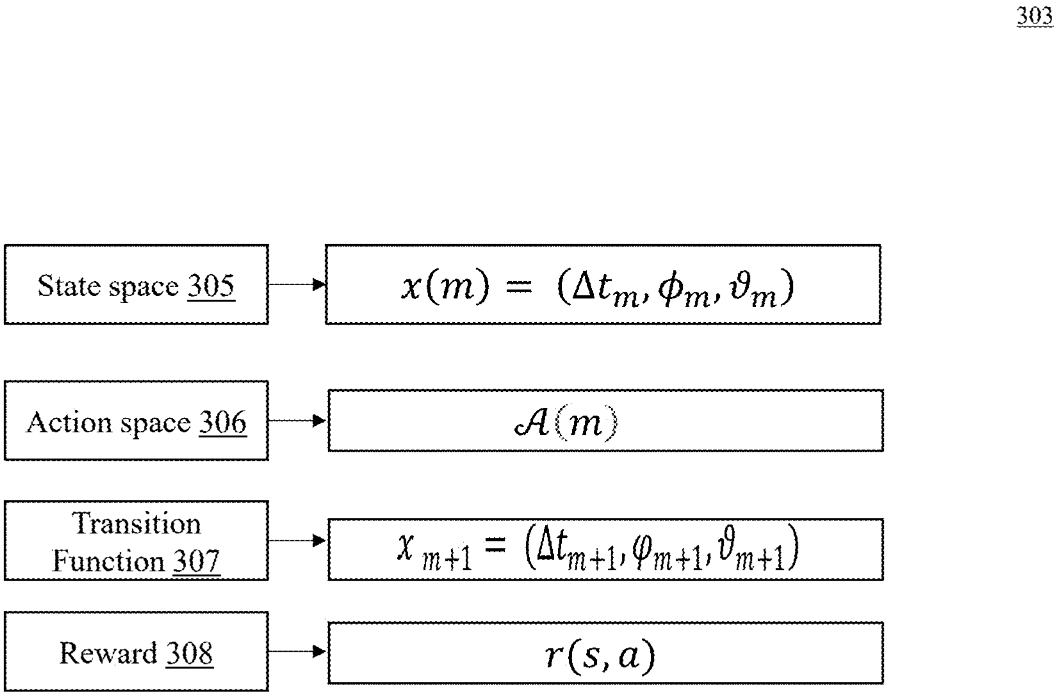
FIG. 3C illustrates a schematic diagram showing the components of the MDP framework in detail, according to an embodiment of the present disclosure.

FIG. 3C illustrates a schematic diagram showing the components of the MDP 303 framework in detail, according to an embodiment of the present disclosure.

For the MDP 303, state space 305 is defined as:

State space: The state $x \in X \triangleq \mathbb{R} \times [0, 2\pi) \times \mathbb{N}_{[0,\ 3N_{dec}]}$ at stage m is given by the triplet $$x_m = (\Delta t_m, \varphi_m, \vartheta_m)$$

where $\Delta t_m \triangleq t_m - t_{arrival}$ with $t_m \in \mathbb{R}$ denoting the time the aircraft 101 enters the stage m, $t_{arrival}$ denoting the desired time of arrival of the aircraft 101 at the airport, $\varphi_m$ denoting the orientation of the aircraft 101 with respect to the merge point 108 at the start of the stage m in the polar coordinate frame centered at the merge point, and $\upsilon_m$ denotes the number of executed speed decrements prior to the stage m. By construction, the speed of the aircraft 101 at the start of stage m is given by $$V_m = V_0 - \vartheta_m \Delta V$$

and the initial state of the MDP 303 is $x_0 = (t_0 - t_{arrival}, \varphi_0, 0)$. The state space 305 describes the state of the aircraft in terms of $\Delta t_m$ which indicates time remaining for the aircraft 101 for reaching the merge point 108.

Action space 306: At each stage $m \in \mathbb{N}_{[0,5]}$, a discrete action $a \in \mathcal{A}(m) \subset \mathbb{N}$ is defined.

Specifically, $$\mathcal{A}(m) = \{\{\mathbb{N}_{[0,N_{hold}]},\ m = 1(\text{HOLD})$$

$$\{\mathbb{N}_{[0,N_{pms}]},\ m = 3(PMS)$$

$$\{\emptyset,\ m = 5\ (\text{GOAL})$$

$$\mathbb{N}_{[0,N_{dec}]},\ \text{otherwise}$$

Transition function 307: The aircraft's 101 motion during the approach phase is modeled as a point mass constrained to the path described in FIG. 1D. For DEC maneuver ($m \in \{0,2,4\}$), the next state under a speed decrement action $\alpha \in \mathcal{A}(m) = \mathbb{N}_{[0,\ N_{dec}]}$ is $$x_{m+1} = (\Delta t_{m+1}, \varphi_{m+1}, \vartheta_{m+1})$$

where $$\Delta t_{m+1} = \Delta t_m + \frac{2BD_{gap}^{(m)} - (a\Delta V)^2}{2B(V_0 - (\vartheta_m + a)\Delta V)}$$

$$\varphi_{m+1} = \begin{cases} \alpha_{hold}, & m = 0 \\ \alpha_{pms}, & m = 2 \\ \varphi_m, & m = 4 \end{cases}$$

$$\vartheta_{m+1} = \vartheta_m + a$$

where $$D_{gap}^{(m)}$$

is the distance between the current position and the entry point of the next stage. Specifically, $$D_{gap}^{(m)} = \begin{cases} \|\langle D_{start}, \phi_0\rangle - \langle D_{hold}, \alpha_{hold}\rangle\|, & m = 0 \\ \|\langle D_{hold}, \alpha_{hol0}\rangle - \langle D_{pms}, \alpha_{pms}\rangle\|, & m = 2 \\ D_{pms}, & m = 4 \end{cases}$$

For HOLD (m=1) and PMS (m=3) maneuvers, the next state under action $\alpha \in \mathcal{A}(1) = \mathbb{N}_{[0,\ N_{hold}]}$ and $\alpha \in \mathcal{A}(3) = \mathbb{N}_{[0,\ N_{pms}]}$ are $$x_{m+1} = (\Delta t_{m+1}, \varphi_{m+1}, \vartheta_{m+1})$$

Where $$\Delta t_{m+1} = \begin{cases} \Delta t_m + aT_{hold}, & m = 1 \\ \Delta t_m + aT_{hold}, & m = 3 \end{cases}$$

$$\varphi_{m+1} = \begin{cases} \alpha_{hold}, & m = 1 \\ \alpha_{pms} + a\theta_{pms}^{step}, & m = 3 \end{cases}$$

$$\vartheta^+ = \vartheta,$$

respectively.

A reward function 308 is given by:

$$r(s, a) = \begin{cases} \text{Terminal Reward } (\Delta t_5), & m = 5 \\ -\text{Action Penalty}(m)a, & \text{otherwise} \end{cases}$$

where TerminalReward: $\mathbb{R} \to \mathbb{R}$ is a terminal reward function on $\Delta t_5$, and ActionPenalty: $\mathbb{N}_{[0,\ 4]} \to \mathbb{R}$ penalizes actions and enforces the preference order for the maneuvers. Specifically, TerminalReward is a continuous function that rewards minimal deviation of $\Delta t_5$ from zero and decays with increasing deviation from zero, i.e., the maximum reward is achieved when the aircraft i reaches the airport at $$t_{arrival}^{(i)},$$

and we incur penalty for reaching too early or too late compared to $t^{(i)}_{arrival}$.

On the other hand, ActionPenalty enforces the order of preference with ActionPenalty(0)=ActionPenalty(2)=ActionPenalty(4)<ActionPenalty(3)<ActionPenalty(1).

In an embodiment, the MDP 303 has a low-dimensional state-space and a single-dimensional discrete action space, therefore principles of dynamic programming are used to design an optimal single-aircraft trajectory. Specifically, a value function is set up as:

$$\mathcal{V}^*_m: \mathcal{X} \to \mathbb{R} \text{ for } m \in N_{[0,5]} \text{ defined by the recursion,} \quad \text{a.}$$

$$\mathcal{V}^*_5(\Delta t_m, \cdot) = TerminalReward(\Delta t), \quad \text{b.}$$

$$\mathcal{V}^*_m(x_m) = \max_{a \in \mathcal{A}(m)} (r(x_m, a) + \mathcal{V}^*_{m+1}(x_{m+1})) \quad \text{c.}$$

For m$\in \mathbb{N}_{[0,4]}$. Given a value function, $$\{\mathcal{V}^*_m\}_{m \in \mathbb{N}_{[0,5]}},$$

an optimal action at any state x may be identified by using the relation:

$$a^* = \arg\max_{a \in \mathcal{A}(m)} (r(x_m, a) + \mathcal{V}^*_{m+1}(x_{m+1}))$$

Here, $\mathcal{A}$(m) is the action space corresponding to the stage m.

Using the MDP 303 framework described above, the state space 305 provides state trajectory for the aircraft 101 where the states have one-to-one correspondence with the sequence of TMA stages 109 represented by the variable m.

In an embodiment, the MDP 303 framework is used in the design of trajectories for single aircraft and incorporate the performance objective and maneuver constraints while designing using the various functions described above.

In an embodiment, a grid is defined over X and backward recursion is performed to obtain an approximation of the value functions $\{\widehat{\mathcal{V}_m}\}_{m \in N_{[0,5]}}$.

The MDP 303 framework is used to formulate the optimal control problem as described above, which is then solved using principles of dynamic programming to determine the state trajectory 105 for the aircraft 101.

Figure 4:
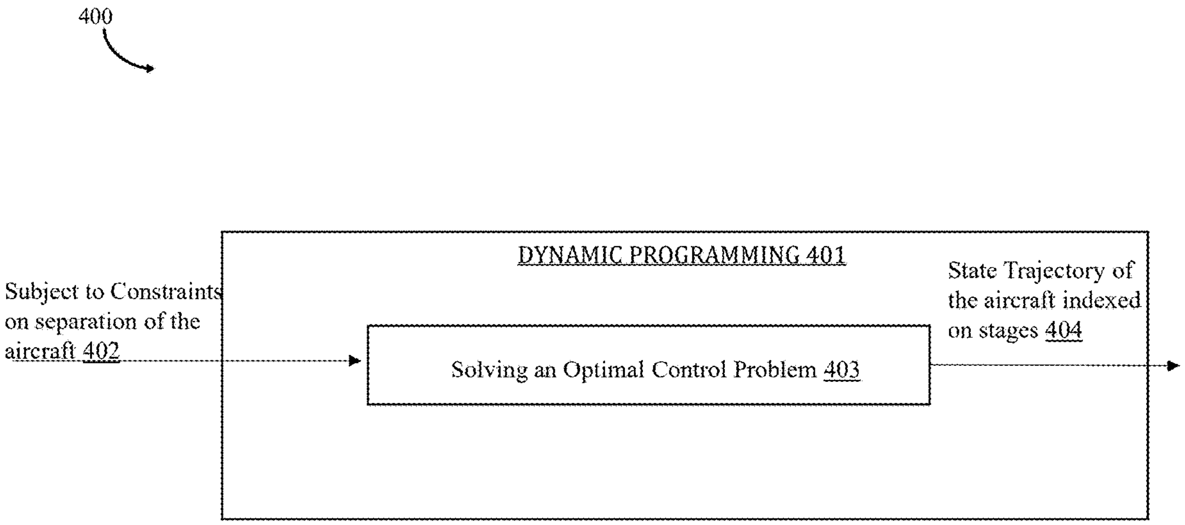
FIG. 4 illustrates a block diagram showing principles of dynamic programming, according to an embodiment of the present disclosure.

FIG. 4 illustrates a block diagram 400 showing principles of dynamic programming 401 that are used to solve an optimal control problem 403 formulates using the MDP 303 framework described above, for determining a state trajectory 404 for an aircraft, according to an embodiment of the present disclosure.

The optimal control problem 403 is equivalent to the optimal control problem 301 shown in FIG. 3A. The optimal control problem 403 is solved using the principles of dynamic programming 401. Dynamic programming is a method that is used to solve complex problems by breaking them down into simpler subproblems, and it is particularly useful in optimization scenarios. The principles of dynamic programming 401 revolve around two primary concepts: constraints and optimization objectives. Understanding these principles allows for the efficient solving of an optimization problem where the goal is to find a feasible solution within given constraints. In dynamic programming, the constraints define the limits or conditions that must be adhered to while solving the optimization problem. The constraints may be of several types, including but not limited to, resource constraints and feasibility constraints. Resource constraints define limitations on available resources such as time, space, or cost. For example, in a knapsack problem, the total weight of items cannot exceed a specified capacity. Feasibility constraints define conditions that ensure the solution adheres to the problem's inherent rules or requirements. In scheduling problems, tasks may need to be scheduled within specific time windows. Additionally, there may be inter-dependency constraints that define conditions that arise from the relationships between subproblems. For instance, in sequence alignment, the alignment of one pair of sequences affects the alignment of subsequent pairs. Dynamic programming manages these constraints by incorporating them into the recursive structure of the optimization problem. This is done by formulating a state space that reflects all scenarios within the constraints, allowing the algorithm for solving the optimization problem to systematically explore feasible solutions.

Dynamic programming also includes optimization objectives that provide conditions for finding best solution for the optimization problem according to a defined criterion. This criterion could be minimizing or maximizing a particular value, such as cost, distance, or profit. The process of optimization involves various principles such as objective function, state definition, recurrence relation, and optimal substructure. The objective function defines what needs to be optimized. In the shortest path problem, for instance, the objective function aims to minimize the total travel distance. The state represents a specific configuration of the problem, capturing the essence of the subproblem solutions. The objective function is often evaluated over these states to determine the optimal solution. The recurrence relation is the mathematical formulation used to express the value of a state in terms of previously solved states. The recurrence relation is central to dynamic programming as it recursively builds up solutions to larger problems from solutions to smaller subproblems. The optimal substructure is the principle that an optimal solution to the problem can be constructed from optimal solutions to its subproblems. This property ensures that the dynamic programming approach is feasible, as it relies on the ability to solve subproblems independently and combine their solutions efficiently.

Dynamic programming may include different algorithmic implementations, such as, a top-down approach and a bottom-up approach. The top-down approach solves the optimization problem by recursively breaking it down into subproblems, storing the results of these subproblems to avoid redundant calculations. The bottom-up approach iteratively builds solutions to subproblems from the ground up, typically using a table to store intermediate results. The table is filled according to the recurrence relations, ensuring that solutions to all subproblems are computed before tackling the overall problem.

The principles of dynamic programming 401 as disclosed above are applied to the optimal control problem 403 that is in essence the trajectory optimization problem 203 shown in FIG. 2B and associated with the one or more parameters such as the performance objective 204, the maneuver constraints 205, the information constraint 206, and the safety constraint 207. These one or more parameters are further defined and explained mathematically with the formulation of the MDP 303 shown in FIG. 3A, FIG. 3B, and FIG. 3C.

Based on these principles and objectives, the controller 106 is configured to generate state trajectories for aircraft to control the motion of the aircraft based on the principles of dynamic programming 401 described above that solve the optimal control problem 403 subject to the constraints 402 on separation of the aircraft 101 to find the state trajectory 404 for the aircraft 101, which is indexed on the sequence of TMA stages 109. The state trajectory 404 is equivalent to the state trajectory 105 shown earlier in conjunction with FIG. 1A.

In some embodiments, solving the optimal control problem 403 includes determining a set of feasible state trajectories for landing the aircraft 101 subject to constraints. The state trajectory of the aircraft 101 is a sequence of partial states of the aircraft 101 corresponding to the TMA stages. For example, a partial state for the aircraft 101 is defined using the state space 305 as $$x_m = (\Delta t_m, \varphi_m, \vartheta_m)$$

as shown earlier in FIG. 3C. The state variables of the partial state of the aircraft 101, such as the state variables $-\Delta t_m$, $\varphi_m$,$\upsilon_m$. To that end, the state variables define the time $\Delta t_m$ remaining for reaching the merging point 108, an angle $\varphi_m$ with respect to the merging point 108, and the number of velocity decrements $\upsilon_m$ of the aircraft 101. In an embodiment, the partial states are selected such that full states of the aircraft 101 are defined by values of the partial states, order of the values of the partial states in the sequence of TMA stages 109, and the action space 306 predetermined for each of the sequence of TMA stages 109. For example, as discussed earlier, for HOLD (m=1) and PMS (m=3) maneuvers, the next state under action $\alpha\in\mathcal{A}(1)=\mathbb{N}_{[0,\ N_{hold}]}$ and $\alpha\in\mathcal{A}(3)=\mathbb{N}_{[0,\ N_{pms}]}$ are $$x_{m+1} = (\Delta t_{m+1}, \varphi_{m+1}, \vartheta_{m+1})$$

Using the set of feasible state trajectories for the aircraft 101 determined using the partial states, the controller 106 selects the state trajectory 105 from the set of feasible state trajectories of the aircraft 101. In some embodiments, the set of feasible state trajectories is used to select an optimal trajectory for the aircraft 101. To that end, the optimal state trajectory is selected using dynamic programming with a reward function specifying priorities of different types of actions, as described in FIG. 3C.

In some embodiments, the set of feasible state trajectories is determined by reachability analysis. In the reachability analysis a reachability of a target tube of trajectories is identified as feasible by an indicator function defined for each of the TMA stages, such that at least two TMA stages are associated with different identity functions.

In some embodiments, the target tube also characterizes the set of "safe" actions to use at each stage $\mathcal{A}_{safe}(m)\subseteq\mathcal{A}(m)$, which may omit some of the allowed actions in $\mathcal{A}(m)$ at stage m for the sake of safety, for example, maintaining separation between the aircraft 101 and 103.

Figure 5A:
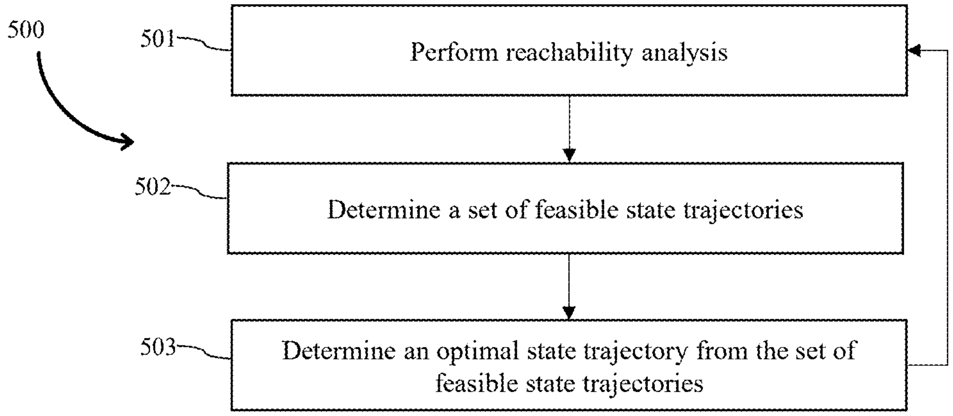
FIG. 5A illustrates a flowchart of a method for determining a set of feasible state trajectories for the aircraft, according to an embodiment of the present disclosure.

FIG. 5A illustrates a flowchart of a method 500 for determining a set of feasible state trajectories for the aircraft 101, according to an embodiment of the present disclosure. The method 500 includes performing reachability analysis 501 by the controller 106 for determining reachability of a target tube of trajectories for the aircraft 101. The performance of reachability analysis 501 is used in the evaluation of a set of safe, feasible paths or the set of feasible trajectories that the aircraft 101 can take over time, ensuring it remains within safe boundaries while avoiding conflicts with other aircraft. To that end, a target tube represents a sequence of spatial and temporal regions (or sets) within which an aircraft's state (position, orientation, speed) must remain over a defined planning horizon. For each time step, there is a specific target set, and together, these form a "tube" that represents safe and acceptable positions over time for the aircraft 101. Essentially, the target tube outlines a corridor of airspace where the aircraft 101 can operate safely without conflicting with other aircraft or violating operational constraints. Through the performance of reachability analysis, the controller 106 evaluates all possible trajectories the aircraft 101 could take, given its dynamic capabilities and environmental constraints, to determine which actions keep it within the target tube. By iterating this analysis, the controller 106 identifies a safe action space for the aircraft 101 where any chosen trajectory will satisfy safety constraints (like collision avoidance and separation minima).

Figure 5B:
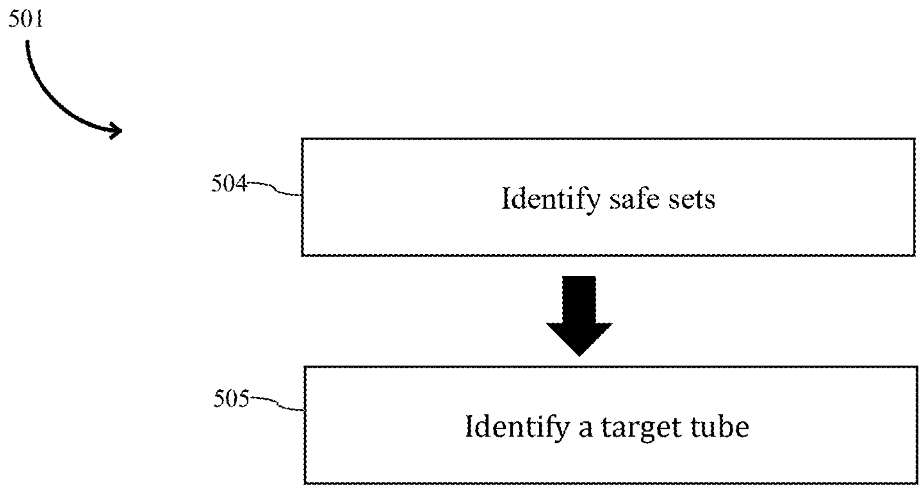
FIG. 5B illustrates a flowchart of a method for performing reachability analysis, according to an embodiment of the present disclosure.

The reachability analysis 501 is described using mathematical formulations as outlined below and using the method described in FIG. 5B. As outlined in FIG. 5B, performing the reachability analysis 501 includes identifying 504 safe sets. This is explained below.

In an embodiment, $N_{[a,b]}$ is the set of natural numbers (including a and b) between $a,b\in\mathbb{N}$ with $a\le b$, and $\|\bullet\|$ denotes the Euclidean norm. Further $<r, \varphi>$ to denotes a two-dimensional point in polar coordinates whose distance from origin is $r\ge 0$ and the point has an orientation with respect to x-axis as $\varphi\in[0, 2\pi)$.

For a nonlinear system, $$x_{k+1} = f_k(x_k, u_k)$$

with state $x_k\in X\subseteq\mathbb{R}^m$ and control $u_K\in\mathcal{U}\subseteq\mathbb{R}^m$. For a horizon $K\in N$, sets $$\{\mathcal{A}_{safe}(k, x_k)\}_{k=0}^{K-1}$$

with $\mathbb{N}_{safe}\subset\mathcal{U}$ for an admissible policy $\pi=\{\mu_0, \ldots, \mu_{K-1}\}$ are the safe action sets that are identified at 504, with $\mu_k(x_k)\in\mathcal{U}_{safe}(k, x_k)$. The state of the closed-loop system, $$x_{k+1} = f_k(x_k, \mu_k(x_k))$$

belongs to a given (safe) set $\mathcal{S}_K\subseteq X$ for $k\in\mathbb{N}_{[-1,\ K-1]}$. In the considered aircraft trajectory design problem, we characterize the safe actions an aircraft can execute at any stage using $\mathbb{N}_{safe}(k, x_k)$.

Once the safe sets are identified, a target tube is identified 505. The collection of sets $$\{\mathcal{S}_k\}_{k=1}^{K}$$

is a tube within which the state must stay using the available control, and the control problem of interest is known as the reachability of the target tube, where $\mathcal{S}_k$ is the target set at time k.

The reachability problem with a target tube $$\{\mathcal{S}_k\}_{k=0}^{K}$$

where $\mathcal{S}_k \subseteq X \times \mathcal{U}$ for $k \in \mathbb{N}_{[0,K-1]}$, and $\mathcal{S}_k \subseteq X$ as a terminal state constraint. For an initial state $x_0$, the reachability problem may be solved by:

$$J^*(x_0) = \min_{\pi \in \Pi} J_\pi(x_0)$$

Where $$J_\pi(x_0) = g_N(x_N) + \sum_{k=0}^{K-1g} g_k(x_k, \mu_k(x_k))$$

$$g_k(x_k, \mu_k) = \begin{cases} 0, & (x_k, \mu_k) \in \mathcal{S}_k \\ 1, & (x_k, \mu_k) \notin \mathcal{S}_k \end{cases}$$

$$g_K(x_K) = \begin{cases} 0, & x_K \in \mathcal{S}_k \\ 1, & x_K \notin \mathcal{S}_k \end{cases}$$

In an embodiment, $J_\pi$ is the number of violations of the target tube $$\{\mathcal{S}_k\}_{k=0}^{K}$$

by the closed-loop trajectory corresponding to a policy $\pi$. The optimal policy minimizes the number of constraint violations $J_\pi$.

In an embodiment, the reachability problem outlined above is solved by dynamic programming using cost-to-go functions $$\{J_k^*\}_{k=0}^{K}$$

that represent the minimum accumulated cost from step k to the final step K. These functions are computed backwards, starting from the final step. At the final step K, the cost-to-go function $$J_k^*$$

is set to $g_K$, where $g_K$ represents the terminal cost or constraint at the last time step. Further, $$J_k^*(x_k)$$

is calculated by choosing the control $\mu_k$ that minimizes the accumulated cost of constraint violation starting from the current state $x_k$, similar to the dynamic programming recursion used to compute $V_m^*$ for MDP 303. At each stage m, the set of safe actions $\mathcal{A}_{safe}(m, x_m)$ that can be used at state $x_m$ is given by the set $$\mathcal{A}_{safe}(m, x_m) = \{u \in \mathcal{U} \mid g_m(x_m, u_m) + J_{m+1}^*(x_{m+1}) = 0\}$$

Once the reachability problem is solved, referring back to FIG. 5A, the controller 106 determines the set of feasible state trajectories. Further, the controller 106 is configured to use the set of feasible state trajectories of the aircraft 101 and at 503, determine an optimal state trajectory for the aircraft 101. Specifically, using $\mathcal{A}_{safe}(m,x_m)$ in place of $\mathcal{A}(m)$ when solving MDP 303, yields a safe and optimal trajectory for aircraft 101 in presence of scheduled aircraft 103.

The determination of optimal state trajectory at 503 and the performance of reachability analysis at 501 is done recursively as new aircrafts keep entering the TMA 102. At each stage, the determined optimal trajectories are further checked for reachability to ensure that a minimum separation is maintained between the multiple aircrafts at all times and no collisions occur.

In an embodiment, to determine the optimal state trajectory for the aircraft 101, in the presence of multiple other aircraft 103, a First-Come, First-Served (FCFS) framework is used for safely optimizing the trajectories of multiple aircraft. In this framework, each aircraft's path is calculated sequentially, considering the pre-determined paths of all preceding aircraft to avoid conflicts. Reachability analysis is applied to determine a safe action space $\mathcal{A}_{safe}$ for each aircraft, ensuring each trajectory stays within the defined "target tube" of safe positions and avoids collisions. Further, the controller 106 is configured to determine safety indicator functions $g_m$ that further verifies that each state-action pair maintains the required separation distance, providing a comprehensive method for conflict-free trajectory planning in the aircraft airspace of the TMA 102. To that end, the indicator functions $g_m$ characterize safe state-actions pairs $$\left(x_m^{(i)}, a_m^{(i)}\right)$$

or each stage $m \in N_{[0,4]}$, such that no collision occurs at all time between the segments m and m+1 between the aircraft i and an aircraft j.

In an embodiment, the indicator functions $g_m$ are defined using $I_{(m_i,m_j)}$, where $I_{(m_i,m_j)}$ are defined using state-action pairs $$\left(x_{m_i}^{(i)}, a_{m_i}^{(i)}\right)$$

that result in collision when aircraft i and j are in segments $m_i$ and $m_j$ respectively. In an example embodiment, five different scenarios are evaluated:

Both aircraft are in stage m=4: The aircraft are exiting the PMS with deceleration maneuvers, requiring separation constraints based on distance and triangle inequality.

Both aircraft are in stage m=3: The aircraft follow the PMS arc at a constant rate, where separation is maintained using the angle between their respective orientations around the arc.

One aircraft in stage m=4, the other in stage m=3: The aircraft are in different stages, where separation is analyzed using the parallelogram law for trajectory difference.

One aircraft in stage m=5: The aircraft has reached tower control of the airport 107, where a pre-specified time separation $T_{sep}>0$ is enforced for safety at the merge point 108.

Remaining cases for aircraft farther from the merge point 108: No separation constraints are needed.

For each scenario, an indicator function is defined to mark unsafe conditions by returning 1 if a separation constraint is violated. These indicator functions are then integrated into a dynamic programming approach that solves trajectory optimization by checking these constraints iteratively. As a result, an optimal state trajectory is identified fir each aircraft, which is then used as the state trajectory 105 of that aircraft and the controller 106 uses this state trajectory 105 for controlling the aircraft, such as the aircraft 101, based on the state trajectory 105 which is the optimal state trajectory calculated using the formulations and calculations described above.

In some embodiments, the optimal state trajectory is saved in a database, such as the database 104 shown in FIG. 1A, that maintains state trajectories of the multiple other aircraft within the TMA 102. The controller 106 is configured to update the indicator functions corresponding to the different TMA stages.

In some embodiments, the optimal state trajectory of the aircraft 101 is removed from the database 104 when the aircraft 101 reaches the merging point 108. Subsequently, the indicator functions for the different TMA stages are also updated.

Figure 6A:
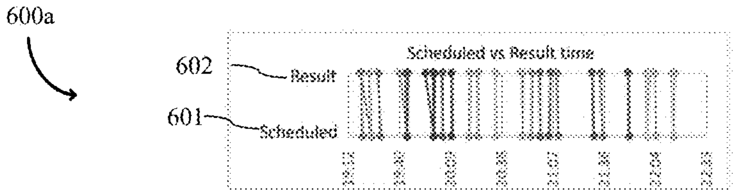
FIG. 6A illustrates a schematic showing a graphical representation of the arrival schedule of different aircraft, according to an embodiment of the present disclosure.

FIG. 6A illustrates a schematic showing a graphical representation 600*a* of the arrival schedule of different aircraft based on the generation of the state trajectories of different aircraft using the controller 106. The graphical representation shows a comparison between a scheduled arrival time 601 and a resulting arrival time 602, based on the usage of the controller 106. As may be observed in the embodiment of FIG. 6A, the controller 106 spreads out the arrival schedule and spaces out the trajectories of the multiple aircraft to avoid collisions, while minimizing deviations from the scheduled arrival time 601.

Figure 6B:
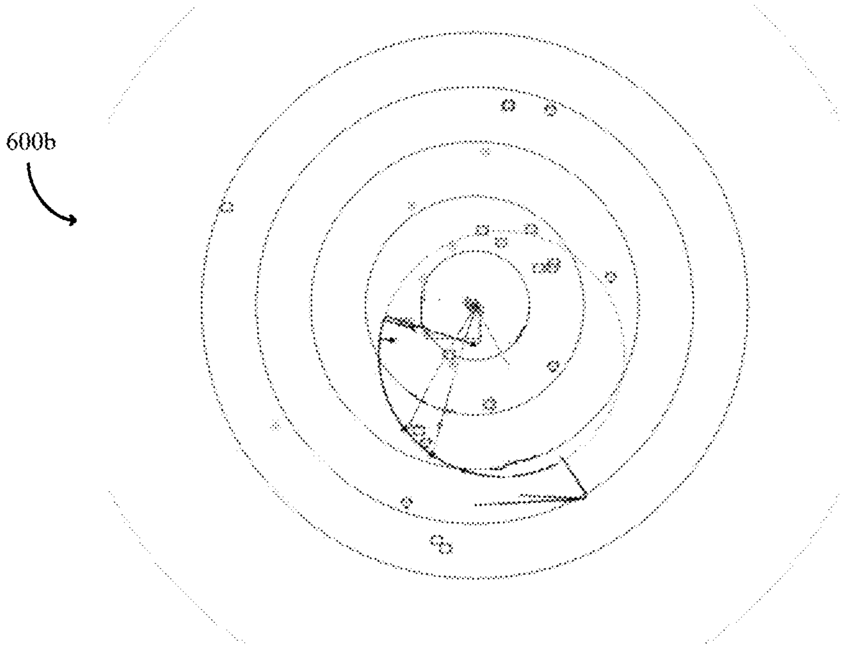
FIG. 6B illustrates a schematic showing a graphical representation of a snapshot of the aircraft trajectories generated by the controller, in the ATC-pie simulator, according to an embodiment of the present disclosure.

FIG. 6B illustrates a schematic showing a graphical representation 600*b* of a snapshot of the aircraft trajectories generated by the controller 106, in the ATC-pie simulator, according to an embodiment of the present disclosure.

Figure 7:
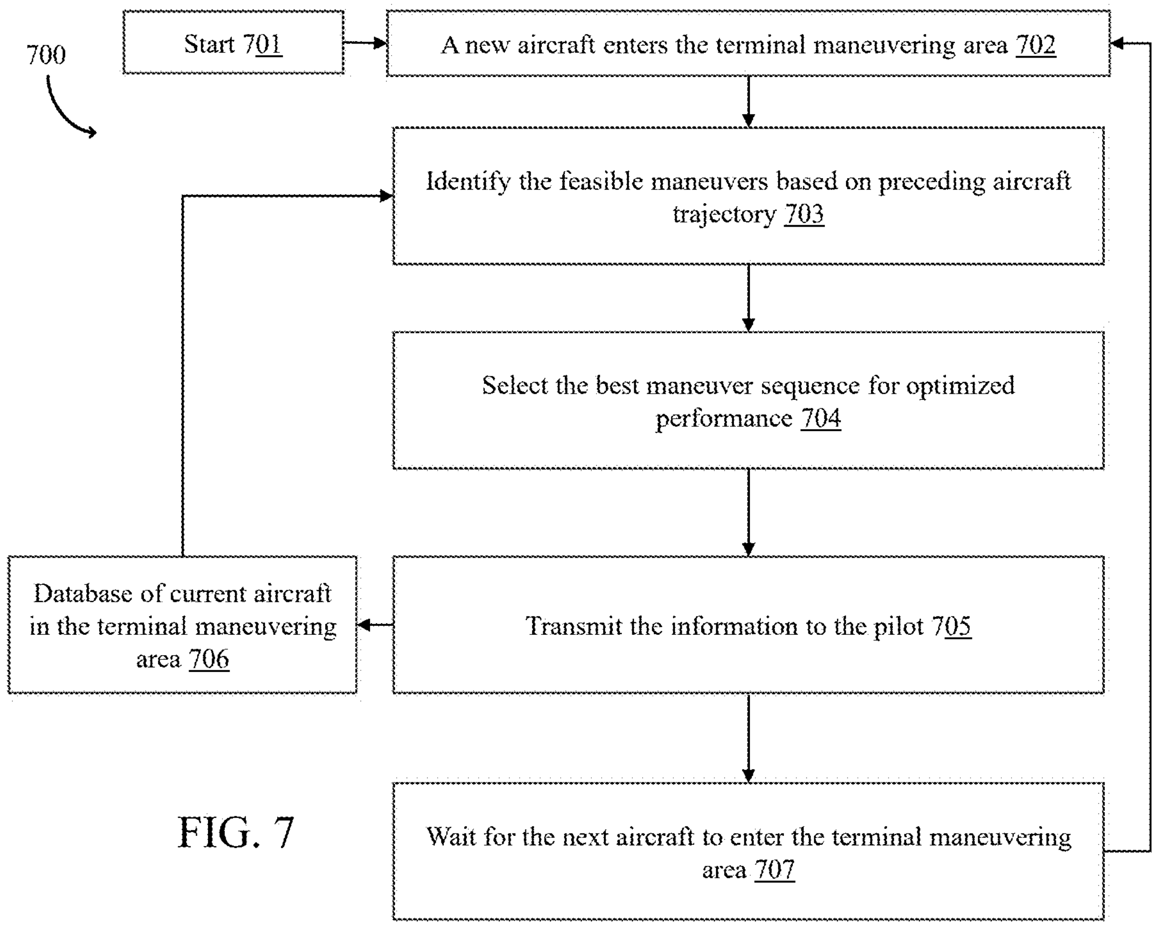
FIG. 7 illustrates flow diagram of a method for generating a state trajectory of an aircraft in the TMA, according to an embodiment of the present disclosure.

FIG. 7 illustrates flow diagram of a method 700 for generating a state trajectory of an aircraft in the TMA 102, according to an embodiment of the present disclosure.

The method 700 starts at 701. At 702, a new aircraft enters the TMA 102. For example, the aircraft 101 enters the TMA 102.

At 703 a set of feasible maneuvers for the aircraft 101 is identified from a database 706 of current aircraft in the TMA 102. For example, the database 104 stores the set of feasible trajectories for the aircraft 101, which may have been identified during an earlier analysis. Using the set of feasible trajectories, the set of feasible maneuvers for the aircraft 101 are identified.

At 704, the set of feasible maneuvers is used to select the best maneuver for the new aircraft, that is the aircraft 101, such that overall aircraft management is optimized. At 705, information associated with the best maneuver is transmitted to a pilot of the new aircraft and also stored in the database 706. At 707, the controller 106 is configured to wait for the next aircraft to enter the TMA 102, and control of execution of the method 700 then returns to operation 702.

In this manner, the method 700 may be executed by the controller 106 multiple times, specifically upon entry of a new aircraft in the TMA 102, in order to determine a state trajectory for the new aircraft and control the new aircraft as per the determined state trajectory. The trajectories generated for the aircraft 101 are safe, avoid collisions among multiple aircraft in the TMA 102 and provide automatic aircraft approach phase management, thereby reducing burned of air traffic control on the ATC.

In an embodiment, the controller 106 is configured for solving a dynamic programming problem which includes a three-dimensional state space (such that two dimensions are continuous, and one dimension is discrete) and a one-dimensional, discrete action space, such that the dynamic programming recursions can be approximated via a grid and solved efficiently.

Figure 8:
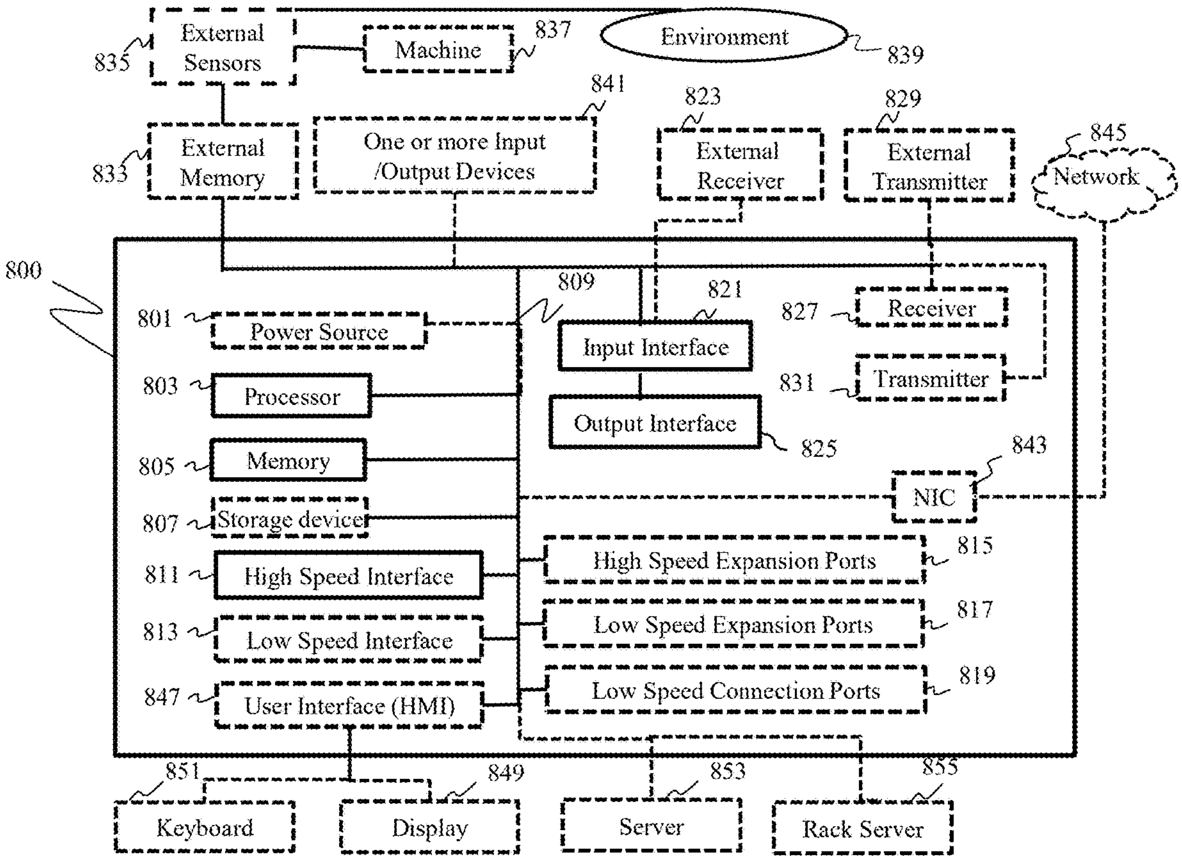
FIG. 8 is a schematic illustrating a computing device for implementing the methods and systems/controllers of the present disclosure.

FIG. 8 is a schematic illustrating a computing device 800 for implementing the methods and systems/controllers of the present disclosure. For example, the computing device 800 is used to implement the controller 106 that controls the aircraft 101 within the TMA 102. The computing device 800 includes a power source 801, a processor 803, a memory 805, a storage device 807, all connected to a bus 809. Further, a high-speed interface 811, a low-speed interface 813, high-speed expansion ports 815 and low speed connection ports 817, can be connected to the bus 809. In addition, a low-speed expansion port 819 is in connection with the bus 809. Further, an input interface 821 can be connected via the bus 809 to an external receiver 823 and an output interface 825. A receiver 827 can be connected to an external transmitter 829 and a transmitter 831 via the bus 809. Also connected to the bus 809 can be an external memory 833, external sensors 835, machine(s) 837, and an environment 839. Further, one or more external input/output devices 841 can be connected to the bus 809. A network interface controller (NIC) 843 can be adapted to connect through the bus 809 to a network 845, wherein data or other data, among other things, can be rendered on a third-party display device, third party imaging device, and/or third-party printing device outside of the computing device 800.

The memory 805 can store instructions that are executable by the computing device 800 and any data that can be utilized by the methods and systems of the present disclosure. The memory 805 can include random access memory (RAM), read only memory (ROM), flash memory, or any other suitable memory systems. The memory 805 can be a volatile memory unit or units, and/or a non-volatile memory unit or units. The memory 805 may also be another form of computer-readable medium, such as a magnetic or optical disk.

The storage device 807 can be adapted to store supplementary data and/or software modules used by the computer device 800. The storage device 807 can include a hard drive, an optical drive, a thumb-drive, an array of drives, or any combinations thereof. Further, the storage device 807 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 803), perform one or more methods, such as those described above.

The computing device 800 can be linked through the bus 809, optionally, to a display interface or user Interface (HMI) 847 adapted to connect the computing device 800 to a display device 849 and a keyboard 851, wherein the display device 849 can include a computer monitor, camera, television, projector, or mobile device, among others. In some implementations, the computer device 800 may include a printer interface to connect to a printing device, wherein the printing device can include a liquid inkjet printer, solid ink printer, large-scale commercial printer, thermal printer, UV printer, or dye-sublimation printer, among others.

The high-speed interface 811 manages bandwidth-intensive operations for the computing device 800, while the low-speed interface 813 manages lower bandwidth-intensive operations. Such an allocation of functions is an example only. In some implementations, the high-speed interface 811 can be coupled to the memory 805, the user interface (HMI) 848, and to the keyboard 851 and the display 849 (e.g., through a graphics processor or accelerator), and to the high-speed expansion ports 815, which may accept various expansion cards via the bus 809.

In an implementation, the low-speed interface 813 is coupled to the storage device 807 and the low-speed expansion ports 817, via the bus 809. The low-speed expansion ports 817, which may include various communication ports (e.g., USB, Bluetooth, Ethernet, wireless Ethernet) may be coupled to the one or more input/output devices 841. The computing device 800 may be connected to a server 853 and a rack server 855. The computing device 800 may be implemented in several different forms. For example, the computing device 800 may be implemented as part of the rack server 855.

The computing device 800 may embody the controller 106 or be coupled to the controller 106 in a suitable configuration to enable the controller 106 to control the aircraft 101 within the TMA 102. In an embodiment, the controller 106 implements a method that causes steps of the method to be executed in the form of computer-executable instructions for controlling an aircraft within a terminal maneuvering area (TMA) of an airport in the presence of multiple other aircraft.

Figure 9A:
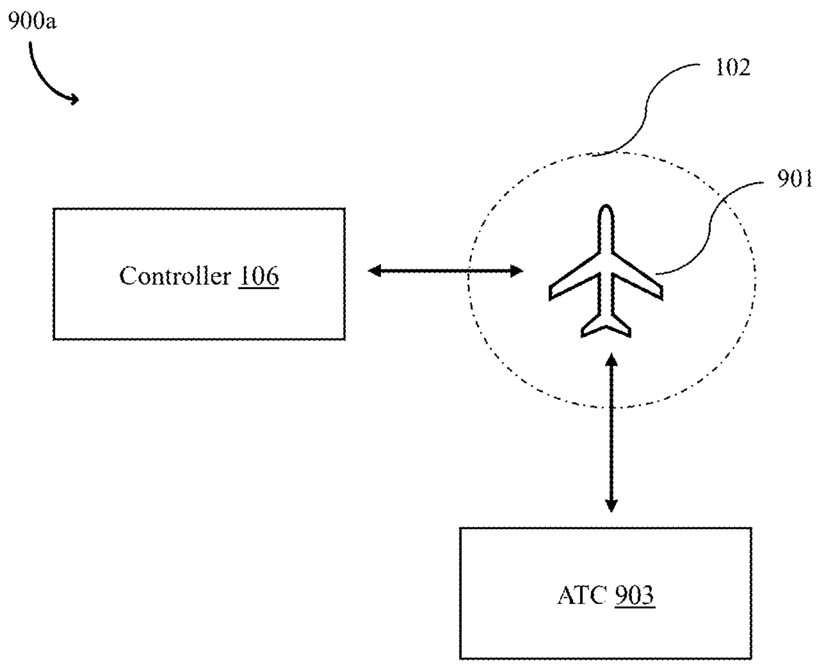
FIG. 9A is a schematic illustrating a use case for implementing the methods and systems/controllers of the present disclosure, according to an embodiment.

FIG. 9A is a schematic illustrating a use case 900*a* for implementing the methods and systems/controllers of the present disclosure, according to an embodiment. The use case 900 corresponds to the controller 106 being used to control an aircraft 901 when the aircraft 901 is in the approach phase and is within the TMA 102.

In an embodiment, the controller 106 is onboard the aircraft 901. To that end, the controller 106 generates one or more control commands. The one or more control commands are transmitted to the aircraft 901 for controlling the aircraft 901.

In an embodiment, the aircraft 901 includes a flight management system (FMS). The FMS may be a computing system that manages navigation, flight planning, and guidance for the aircraft 901. In some embodiments, a pilot inputs a route, altitude, speed, and other parameters, and the FMS uses this data to control the flight path for the aircraft 901. The one or more control commands generated by the controller 106 may then be used by the FMS, along with other inputs like route, altitude, speed etc., to control the flight path or the trajectory of the aircraft 901.

In an embodiment, the controller 106 also transmits one or more control commands to an autopilot system which controls the aircraft's 901 heading, altitude, and speed based on instructions from the FMS. For example, the autopilot system may automate pitch (nose up or down), roll (wing tilt), and yaw (rudder movement) to maintain stability and control for the aircraft 901.

In an embodiment, the controller 106 also communicates with other systems associated with the aircraft 901, such as an inertial navigation system (INS), a global positioning system (GPS), a radar system, an air data computer (ADC), an electronic flight instrument system (EFIS), throttle and engine control systems, accelerometers, gyroscopes, and the like.

In an embodiment, the aircraft 901 is an unmanned aircraft, such as a drone or an unmanned aerial vehicle (UAV), and the controller 106 may be onboard the unmanned aircraft for controlling the trajectory of the unmanned aircraft.

The controller 106 generates aircraft trajectories for controlling the aircraft 901 near an airport having the TMA 102, such that the generated aircraft trajectories satisfy manoeuvre, timing, and separation constraints. The controller 106 provides a first-come-first serve (FCFS) framework to split the air traffic management problem into a collection of single-aircraft scheduling problems, identifies reachability-based constraints on the single-aircraft scheduling problem to ensure safety of the aircraft 901, and then solves the individual single-aircraft scheduling problem using dynamic programming. The dynamic programming-based generation of aircraft trajectories provides a tractable and low-dimensional formulation of the trajectory optimization problem that incorporates the manoeuvre constraints, for a single aircraft as well as multiple aircraft approaching the TMA 102.

Using the dynamic programming-based generation of aircraft trajectories disclosed in various embodiments above, the aircraft 901 is able to perform a zero collision approach to the merge point 108, and in presence of multiple other aircraft, the controller 106 spreads out the arrival schedule of different aircraft and spaces out the trajectories to avoid collisions, while minimizing deviations.

Once the approach phase for the aircraft 901 is safely executed, the controller 106 passes control of the aircraft 901 to an ATC 903 for conducting landing manoeuvres.

Figure 9B:
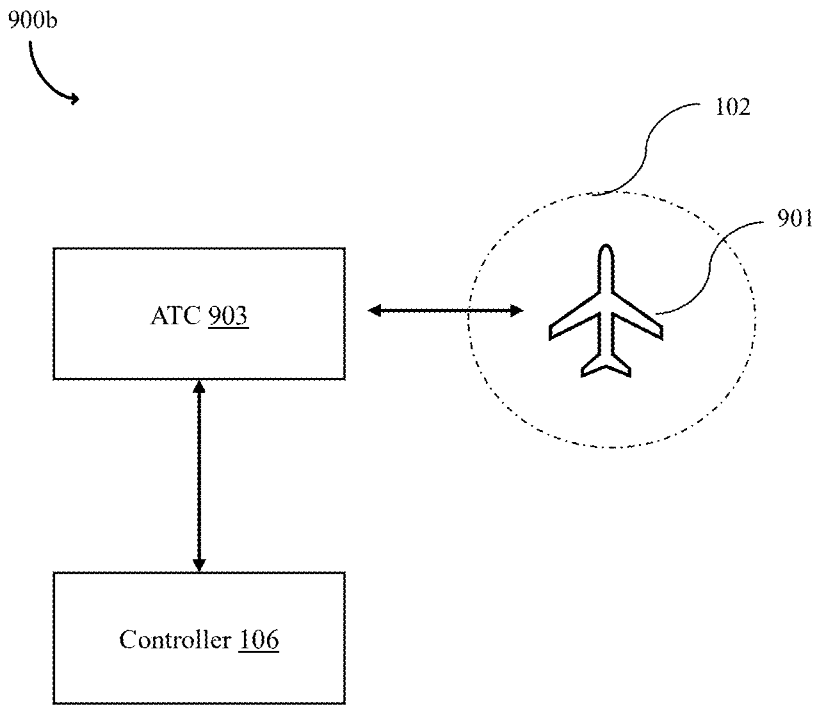
FIG. 9B is a schematic illustrating another use case for implementing the methods and systems/controllers of the present disclosure, according to an embodiment.

FIG. 9B is a schematic illustrating a use case 900*b* for implementing the methods and systems/controllers of the present disclosure, according to an embodiment. The use case 900*b* corresponds to the controller 106 being used to send one or more control commands to the ATC 903. The ATC 903 then uses the one or more control commands to control the aircraft 901 when the aircraft 901 is in the approach phase and is within the TMA 102. To that end, the controller 106 generates the one or more control commands based on the generated state trajectory and transmits the generated state trajectory and the generated control commands to the ATC 903. The ATC 903 uses received state trajectory and control commands to communicate a finalized trajectory plan to the pilot controlling the aircraft 901.

In an embodiment, the ATC 903 receives the one or more control commands and the state trajectory on a display interface associated with a computing system of the ATC 903 system. The display interface may be monitored by a controller who then uses the received one or more control commands as guidelines for communicating with the pilot onboard the aircraft 901, for controlling the aircraft 901 according to the guidelines.

Figure 9C:
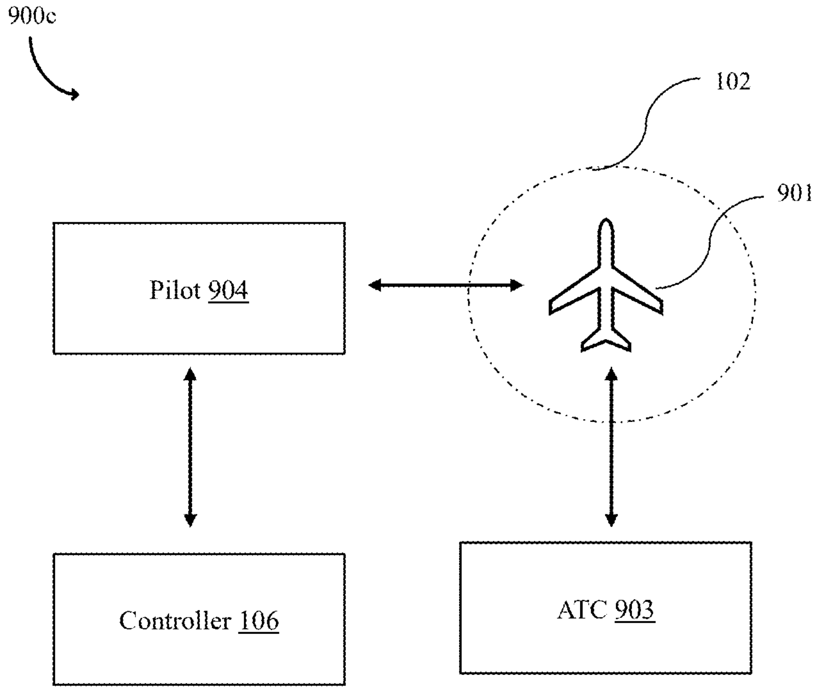
FIG. 9C is a schematic illustrating another use case for implementing the methods and systems/controllers of the present disclosure, according to an embodiment.

FIG. 9C is a schematic illustrating a use case 900*c* for implementing the methods and systems/controllers of the present disclosure, according to an embodiment. The use case 900*c* corresponds to the controller 106 being used by a pilot 904 to control the aircraft 901 when the aircraft 901 is in the approach phase and is within the TMA 102. The pilot 904 receives one or more control commands from the controller 106 and uses these one or more control commands to control the aircraft 901 directly. The controller 106 may be located onboard the aircraft 901 or may be located at a remote server and communicates with the pilot 904 using the FMS of the aircraft 901.

In an embodiment, the pilot 904 uses the one or more control commands generated by the controller 106 to bypass instructions provided by the ATC 903 to control the aircraft 901, when the aircraft 901 is in the TMA 102.

Using the various methods and systems disclosed herein, the controller 106 enables efficient aircraft approach management near airports. The controller 106 effectively schedules multiple aircraft for landing at the airport when they are in the vicinity of the TMA 102. The controller 106 prescribes safe trajectories for aircraft approach under constraints arising from dynamics, actuation limitations, and safety requirements while optimizing various performance metrics including minimizing the deviation from the desired landing time, minimizing communication between air traffic control and pilots, and maximizing satisfaction of manoeuvre preferences. The controller 106 encodes the constraints as restrictions on the actions available to each aircraft. The controller 106 computes the safe action sets via reachability analysis and dynamic programming. Further, the controller 106 enables identification of the best action that optimizes the performance metric using different search techniques. To that end, the various embodiments disclosed herein provide the systems and the methods that enables interpretable scheduling for aircraft that works in tandem with human air traffic controllers.

In an embodiment, the controller 106 is used in busy airspaces, FCFS and reachability analysis ensure that each aircraft maintains safe separation from others in a controlled sequence. This is essential for organizing landing sequences at airports, avoiding mid-air conflicts, and minimizing delays during approach.

In an embodiment, the controller 106 is used in the design of onboard collision avoidance systems that help pilots and autonomous systems select safe trajectories in real-time. By pre-computing safe paths based on known trajectories of nearby aircraft, onboard systems can act quickly in case of a potential conflict.

In an embodiment the controller 106 used for autonomous drones and air taxis in urban areas, FCFS and reachability-based trajectory planning help manage complex airspace with high volumes of small aircraft. Ensuring safe, optimized routes in dense urban settings is essential for avoiding collisions and maintaining efficiency.

In an embodiment, the controller 106 is used in applications involving unmanned aerial vehicles (UAVs) or drones, especially in low-altitude airspace, reachability analysis supports safe routing, particularly when multiple drones are operated autonomously or remotely.

In an embodiment, the controller 106 is used for Flight Delay Minimization. By optimizing single-aircraft trajectories with safety constraints involving other aircraft, this framework minimizes delays due to traffic conflicts. This improves overall scheduling efficiency for both commercial airlines and air traffic control.

The description provides exemplary embodiments only and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims. Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, using machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further, some embodiments of the present disclosure can be implemented as one or more computer programs, i.e., one or more modules of computer program instructions encoded on a tangible non-transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

Computers suitable for the execution of a computer program include, by way of example, can be based on general or special purpose microprocessors or both, and any other kind of central processing unit. Generally, a central processing unit will receive instructions and data from a read only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A method for controlling an aircraft within a terminal maneuvering area (TMA) of an airport in a presence of multiple other aircraft, comprising:

determining a state trajectory of the aircraft, the state trajectory indexed on a predetermined sequence of TMA stages of the aircraft approaching a merging point in the TMA based on solving an optimal control problem subject to constraints maintaining a pre-determined separation of the aircraft from another aircraft of the multiple other aircraft in the TMA, such that the state trajectory of the aircraft is a sequence of states of the aircraft, the sequence of states having a one-to-one correspondence with the sequence of TMA stages, wherein a state of the aircraft includes a time state variable indicative of a time remaining for reaching the merging point, wherein each of the predetermined sequence of TMA stages are associated with an action space permitted for the corresponding TMA stage, wherein the optimal control problem is solved using a discrete-stage decision framework having discretization of TMA stages replacing discretization of time to find an evolution of the states of the aircraft over the sequence of the TMA stages; and causing controlling of the aircraft for each of the predetermined sequence of TMA stages based on the determined state trajectory.

2. The method of claim 1, wherein the sequence of TMA stages comprises at least: a start stage, a start-to-hold stage, a hold stage, a hold-to-point-merge-system (PMS) stage, a PMS stage, a PMS-to-goal stage and a goal stage.

3. The method of claim 1, wherein the discrete-stage decision framework comprises a discrete-stage Markov Decision Process (MDP) framework having the discretization of TMA stages replacing the discretization of time to find the evolution of the states of the aircraft over the sequence of the TMA stages.

4. The method of claim 1, wherein the optimal control problem is solved using dynamic programming.

5. The method of claim 1, wherein solving the optimal control problem comprises:

determining a set of feasible state trajectories for landing the aircraft subject to constraints, wherein the state trajectory of the aircraft is a sequence of partial states of the aircraft corresponding to the TMA stages, wherein state variables of a partial state of the aircraft are selected such that full states of the aircraft are defined by values of the partial states, order of the values of the partial states in the sequence, and an action space predetermined for each of the TMA stages; and selecting the state trajectory from the set of feasible state trajectories of the aircraft.

6. The method of claim 5, wherein the set of feasible state trajectories is determined by reachability analysis testing a reachability of a target tube of trajectories identified as feasible by an indicator function defined for each of the TMA stages, such that at least two TMA stages are associated with different indicator function.

7. The method of claim 6, further comprising:
adding the state trajectory into a database maintaining state trajectories associated with the multiple other aircraft within the TMA; and
updating the indicator function for different TMA stages.

8. The method of claim 7, further comprising:
removing the state trajectory from the database maintaining state trajectories of the multiple other aircraft within the TMA upon the aircraft reaching the merging point; and
updating the indicator functions for different TMA stages.

9. The method of claim 5, wherein the state trajectory is selected using dynamic programming with a reward function specifying priorities of different types of actions.

10. The method of claim 5, wherein the partial state of the aircraft includes the time remaining for reaching the merging point, an angle with respect to the merging point, and a velocity of the aircraft.

11. The method of claim 5, further comprising causing controlling of the aircraft based on the state trajectory.

12. The method of claim 1, wherein the causing of the controlling of the aircraft comprises: transmitting one or more control commands to the aircraft for the controlling the aircraft.

13. The method of claim 1, wherein the causing of the controlling of the aircraft comprises: transmitting one or more control commands to an air traffic controller for controlling the aircraft.

14. The method of claim 1, wherein the causing of the controlling of the aircraft comprises: transmitting one or more control commands to a display interface accessed by a pilot for the controlling of the aircraft.

15. A controller for controlling an aircraft within a terminal maneuvering area (TMA) of an airport in a presence of multiple other aircraft, the controller comprising: a processor; and a memory having instructions stored thereon that, when executed by the processor, cause the controller to:
solve an optimal control problem subject to constraints maintaining a pre-determined separation of the aircraft from the multiple other aircraft in the TMA to determine a state trajectory of an aircraft indexed on a predetermined sequence of TMA stages of the aircraft approaching a merging point in the TMA, such that the state trajectory of the aircraft is a sequence of states having a one-to-one correspondence with the sequence of TMA stages, wherein a state of the aircraft includes a time state variable indicative of a time remaining for reaching the merging point, wherein different TMA stages are associated with different action space permitted for a specific TMA stage, wherein the optimal control problem is solved using a discrete-stage decision framework having discretization of TMA stages replacing discretization of time to find an evolution of the states of the aircraft over the sequence of the TMA stages; and
control the aircraft for different TMA stages according to the state trajectory.

16. The controller of claim 15, wherein solving the optimal control problem comprises:
determining a set of feasible state trajectories for landing the aircraft subject to the constraints, wherein the state trajectory of the aircraft is a sequence of partial states of the aircraft corresponding to the TMA stages, wherein state variables of a partial state of the aircraft are selected such that full states of the aircraft are defined by values of the partial states, order of the values of the partial states in the sequence, and action space predetermined for each of the TMA stages; and
selecting an optimal state trajectory from the set of feasible state trajectories of the aircraft.

17. The controller of claim 16, wherein the set of feasible state trajectories is determined by reachability analysis testing a reachability of a target tube of trajectories identified as feasible by an indicator function defined for each of the TMA stages, such that at least two TMA stages are associated with different indicator function.

18. The controller of claim 17, wherein the processor is configured to cause the controller to:
add the optimal state trajectory into a database maintaining state trajectories of the multiple other aircraft within the TMA; and
update the indicator functions for different TMA stages.

19. The controller of claim 18, wherein the processor is configured to cause the controller to:
remove the optimal state trajectory from the database maintaining state trajectories of the multiple other aircraft within the TMA upon the aircraft reaching the merging point; and
update the indicator functions for different TMA stages.

20. The controller of claim 16, wherein the partial state includes the time remaining for reaching the merging point, an angle with respect to the merging point, and velocity of the aircraft.

* * * * *